US009245037B2

(12) United States Patent
Stouffer et al.

(10) Patent No.: US 9,245,037 B2
(45) Date of Patent: Jan. 26, 2016

(54) NAVIGABLE WEBSITE ANALYSIS ENGINE

(71) Applicants: Scott A. Stouffer, Bradenton, FL (US); Maura D. Stouffer, Bradenton, FL (US)

(72) Inventors: Scott A. Stouffer, Bradenton, FL (US); Maura D. Stouffer, Bradenton, FL (US)

(73) Assignee: Mainwire LLC., El Dorado, Panama (PA)

( * ) Notice: Subject to any disclaimer, the term of this patent is extended or adjusted under 35 U.S.C. 154(b) by 0 days.

(21) Appl. No.: 13/845,651

(22) Filed: Mar. 18, 2013

(65) Prior Publication Data
US 2013/0282691 A1 Oct. 24, 2013

Related U.S. Application Data

(63) Continuation of application No. 12/273,004, filed on Nov. 18, 2008, now Pat. No. 8,447,751.

(60) Provisional application No. 60/988,810, filed on Nov. 18, 2007.

(51) Int. Cl.
*G06F 17/30* (2006.01)

(52) U.S. Cl.
CPC ...... *G06F 17/30867* (2013.01); *G06F 17/3089* (2013.01); *G06F 17/30864* (2013.01)

(58) Field of Classification Search
CPC ........ G06F 17/30; G06F 17/89; G06F 17/899
USPC ........................................................ 707/709
See application file for complete search history.

(56) References Cited

U.S. PATENT DOCUMENTS

| 5,873,079 | A | 2/1999 | Davis, III et al. |
| 5,987,446 | A | 11/1999 | Corey et al. |
| 6,041,326 | A | 3/2000 | Amro et al. |
| 6,285,999 | B1 | 9/2001 | Page |
| 6,473,756 | B1 | 10/2002 | Ballard |
| 6,477,575 | B1 | 11/2002 | Koeppel et al. |
| 6,529,939 | B1 | 3/2003 | Kraft |
| 6,601,075 | B1 | 7/2003 | Huang et al. |
| 6,615,209 | B1 * | 9/2003 | Gomes et al. |

(Continued)

FOREIGN PATENT DOCUMENTS

GB 2377773 A 1/2003

OTHER PUBLICATIONS

International Search Report and Written Opinion for International Application No. PCT/US08/83932 mailed Sep. 16, 2009, 14 pages.

(Continued)

*Primary Examiner* — Brittany N Allen
(74) *Attorney, Agent, or Firm* — Banner & Witcoff, Ltd.

(57) ABSTRACT

An optimization engine allows website publishers and other network document publishers to view and navigate statistics and scoring methodologies of a search engine. Publishers may thus gain a better understanding of how their website or network document is scored and how to optimize those documents to increase a search engine score. The user is thus able to navigate the network from the perspective of a search engine, viewing webpages, websites, and links in the same way a search engine would analyze them. Upon making changes to a website or network document, publishers may further request on-demand re-crawling of their website or network document to view changes in the score. Alerts may also be activated by a user to notify the user when certain conditions are met.

33 Claims, 61 Drawing Sheets

(56) References Cited

U.S. PATENT DOCUMENTS

| | | |
|---|---|---|
| 6,691,108 B2 | 2/2004 | Li |
| 6,832,218 B1 | 12/2004 | Emens et al. |
| 6,850,988 B1 | 2/2005 | Reed |
| 6,915,454 B1 | 7/2005 | Moore et al. |
| 7,475,067 B2 | 1/2009 | Clary et al. |
| 7,496,557 B2 | 2/2009 | Balasubramanian et al. |
| 7,774,335 B1 | 8/2010 | Scofield et al. |
| 7,797,200 B2 | 9/2010 | Patrawala |
| 7,877,392 B2 | 1/2011 | Grieselhuber et al. |
| 2001/0012064 A1 | 8/2001 | Kubo |
| 2002/0059339 A1 | 5/2002 | McCormick et al. |
| 2002/0129014 A1 | 9/2002 | Kim et al. |
| 2002/0147637 A1 | 10/2002 | Kraft et al. |
| 2002/0147805 A1 | 10/2002 | Leshem et al. |
| 2003/0018626 A1 | 1/2003 | Kay et al. |
| 2003/0128231 A1* | 7/2003 | Kasriel et al. ............. 345/736 |
| 2003/0130982 A1 | 7/2003 | Kasriel et al. |
| 2003/0131097 A1 | 7/2003 | Kasriel et al. |
| 2003/0131106 A1 | 7/2003 | Kasriel |
| 2003/0208578 A1 | 11/2003 | Taraborelli et al. |
| 2004/0030741 A1 | 2/2004 | Wolton et al. |
| 2004/0205575 A1 | 10/2004 | Wattenberg |
| 2005/0114324 A1 | 5/2005 | Mayer |
| 2005/0144158 A1 | 6/2005 | Capper et al. |
| 2006/0015571 A1 | 1/2006 | Fukuda et al. |
| 2006/0224593 A1 | 10/2006 | Benton et al. |
| 2006/0253345 A1 | 11/2006 | Heber |
| 2007/0038646 A1 | 2/2007 | Thota |
| 2007/0239768 A1 | 10/2007 | Quinn-Jacobs |
| 2007/0240050 A1 | 10/2007 | Quinn-Jacobs |
| 2008/0010262 A1 | 1/2008 | Frank |
| 2008/0082528 A1* | 4/2008 | Bonzi ............. G06F 17/30867 1/1 |
| 2008/0133500 A1 | 6/2008 | Edwards et al. |
| 2008/0154873 A1 | 6/2008 | Redlich et al. |
| 2008/0168135 A1 | 7/2008 | Redlich et al. |
| 2008/0189254 A1* | 8/2008 | Cancel ............. G06Q 30/02 1/1 |
| 2008/0195674 A1 | 8/2008 | Kim et al. |
| 2008/0208808 A1 | 8/2008 | Sue et al. |
| 2008/0209339 A1 | 8/2008 | Macadaan et al. |
| 2008/0243785 A1 | 10/2008 | Stading |
| 2008/0243786 A1 | 10/2008 | Stading |
| 2008/0243787 A1 | 10/2008 | Stading |
| 2008/0244429 A1 | 10/2008 | Stading |
| 2008/0244740 A1 | 10/2008 | Hicks et al. |
| 2008/0313144 A1 | 12/2008 | Huston |
| 2009/0319927 A1 | 12/2009 | Beeman et al. |
| 2010/0076838 A1 | 3/2010 | Steelberg et al. |

OTHER PUBLICATIONS

Baoyao Zhou, et al., "Website link structure evaluation and improvement based on user visiting patterns", Proceedings of the 12th ACM conference on Hypertext and Hypermedia, Session 7b, Metrics, Arhus, Denmark, 2001, pp. 241-244.

Barbara Poblete, et al., "A content and structure website mining model", Proceedings of the 15th international conference on World Wide Web, Poster Session Browsers and UI, web engineering, gypermedia and multimedia, security, and accessibility, Edinburgh, Scotland, 2006, pp. 957-958.

Bernard J. Jansen and Amanda Spink, "An Analysis of Web Docuemnts Retrieved and Viewed", School of Information Sciences and Technology, The 4th International Conference on Internet Computing, Las Vegas, Nevada, Jun. 23-26, 2006, pp. 65-69.

Ryen W. White, et al., "The Use of Implicit Evidence for Relevance Feedback in Web Retrieval", Lecture Notes in Computer Science, Publisher Springer Berlin/Heidelberg, ISSN 0302-9743 (Print) 1611-3349 (Online), vol. 2291-2002, pp. 449-479.

Sacarea, et al., "Improving conceptual search results reorganization using term-concept mappings retrieved from Wikipedia", IEEE International Conference on Automation, Quality and Testing, Robotics, 2008, AQTR 2008, Published May 22-25, 2008, vol. 3, Cluj-Napoca, Romania, pp. 234-238.

Castellucci, et al., "Searching ans surfing the Web suing a semi-adaptive meta-engine", Proceedings of the International Conference on Information Technology: Coding and Computing, Las Vegas, NV, Apr. 2-4, 2001, pp. 416-420.

Lei Zhang et al., "EnjoyPhoto: A vertical image search engine for enjoying high-quality photos", Proceedings of the 14th Annual ACM International Conference on Multimedia, MM 2006, pp. 367-376.

"PageRank—Wikipedia, the free encyclopedia", downloaded from <http://en.wikipedia.org/wiki/PageRank>, on Nov. 18, 2008, 10 pages.

* cited by examiner

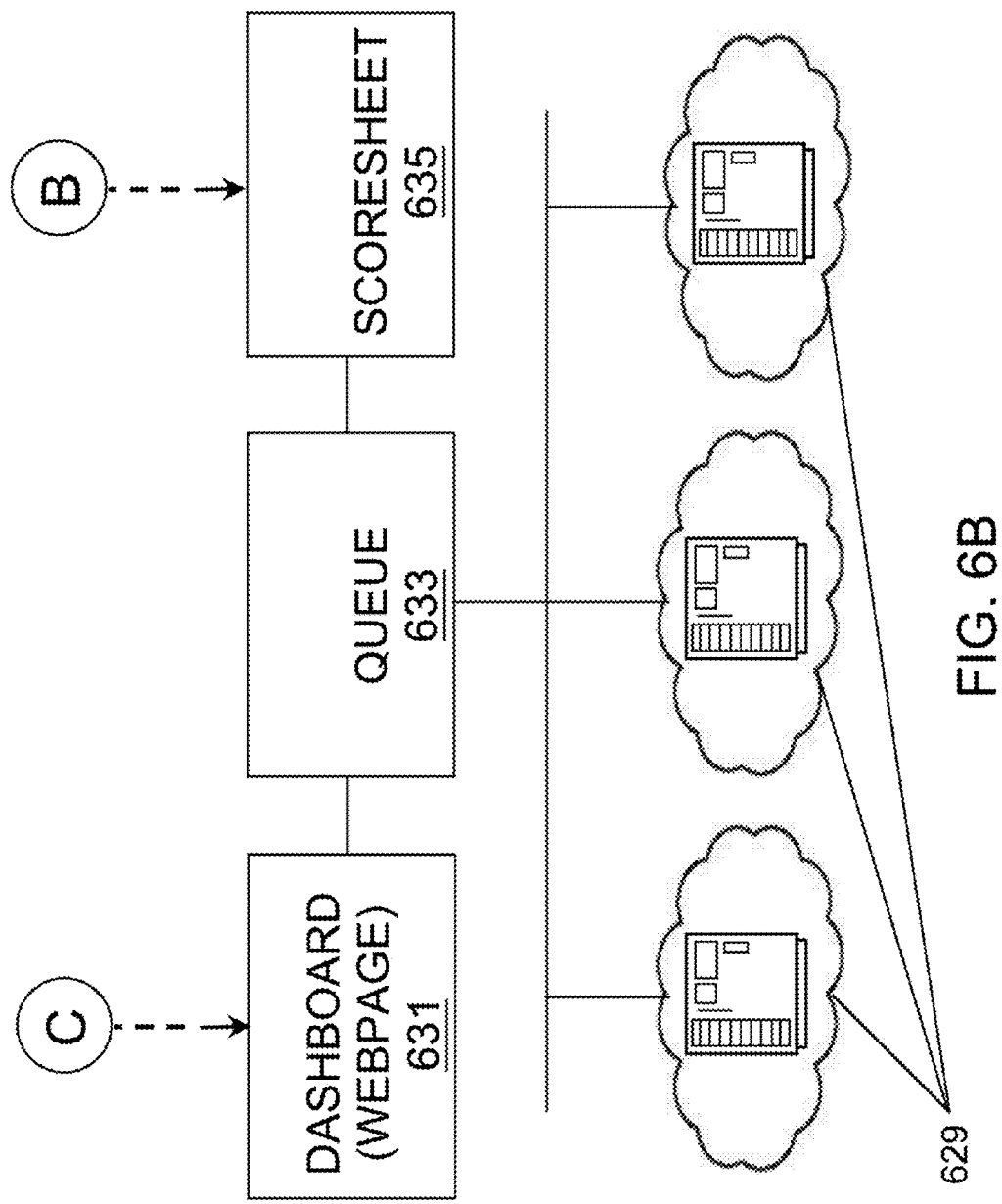

ooo {SEOENG}.ıll
search engine optimization engine

◉ What is SEOENG? ◉ SEOENG™ Features ◎ Take a Test Drive ⓢ SEOENG™ Private Label & OEM http://www.venicechamber.com    [SEOENG Search]

SEOENG (see-ehm) v. to affect a website so as to make it highly visible to the world.™

Website Dashboard    http://www.venicechamber.com (0.01 seconds)

| Webpage Statistics | Link Statistics | Crawl Statistics | Alerts | Reports | Robots | Create SEOENG Rules™ |

| Quality | Missing | Duplicate |
723

Duplicate Website Info

| | | |
|---|---|---|
| 737 | No. of Duplicate META Titles in Website | 18 | ⊘ |
| 739 | No. of Duplicate META Descriptions in Website | 53 | ⊘ |
| 741 | No. of Duplicate META Keywords in Website | 56 | ⊘ |
| 743 | No. of Duplicate Market Focus™ in Website | 26 | ⊘ |
| 745 | No. of Duplicate URL Spellings in Website | 0 | ⊘ |
| 747 | No. of Exact Duplicate Webpages in Website | 18 | ⊘ |

{SEOENG} search engine optimization engine

- What is SEOENG? - SEOENG™ Features - Take a Test Drive - SEOENG™ Private Label & OEM http://www.venicechamber.com | SEOENG Search |

SEOENG (see-ohng) v. to affect a website so as to make it highly visible to the word."

http://www.venicechamber.com (0.01 seconds)

| Website Dashboard | | | | | | | | |
|---|---|---|---|---|---|---|---|---|
| Webpage Statistics | Link Statistics | Crawl Statistics | Alerts | Reports | Robots | Create SEOENG Rules™ |
| | Outgoing Links | Incoming Links | Link Quality | Link Neighborhood |
| | Link Loss™ | | 757 | |

| Link Quality | | |
|---|---|---|
| 773 | No. of Broken Links in Website | 6 |
| 775 | No. of Dangling Links in Website | 75 |
| 777 | No. of Nofollow Links in Website | 0 |
| 779 | No. of Non-Editorial Links in Website | 3,090 |

FIG. 7F

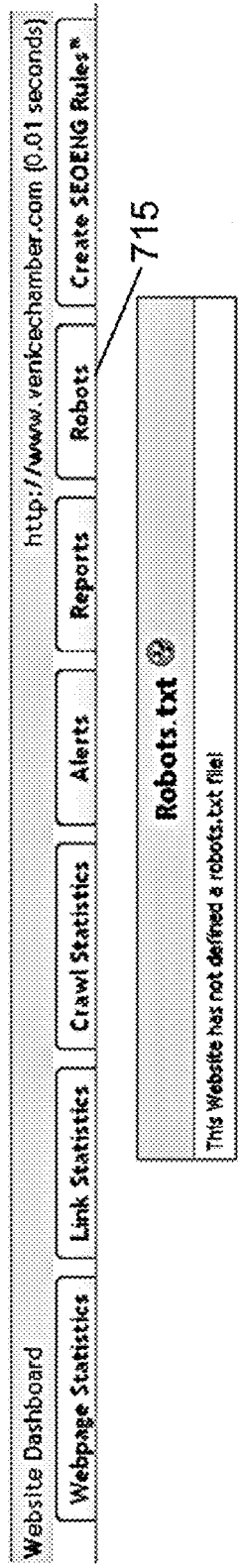
FIG. 7L

Website Dashboard → Webpage Scoresheet → Webpage Scorecard     http://www.venicech Webpage: http://www.venicechamber.com
Statistics as of: 11-02-2008 19:31:09 EST

[ Summary ] [ Detailed Penalties ] [ Alerts ] [ Create SEOENG Rules™ ] [ Repair Station ]

| Penalties | | | |
|---|---|---|---|
| Penalty Description | Penalty Score | Penalty Location | Penalty Affect on SEOENG Score™ |
| # Unique Words on Webpage | 20 | | - 22.87 % |
| % 'Outgoing Paid Links' | 100.00 % | 🕐 | - 20.00 % |
| % 'Incoming Paid Links' | 76.99 % | 🕐 | - 3.85 % |
| Avg. Word Length | 6.68 | | - 0.01 % |
| Avg. Link Flow™ of External Webpages Linked from this Webpage | 3,188.00 | 🕐 | - 0.00 % |
| Avg. Link Flow™ of External Webpages Linking to this Webpage | 126.62 | 🕐 | - 0.00 % |
| # Duplicate Market Focus | 0 | 🕐 | - 0.00 % |
| # Duplicate Content | 1 | 🕐 | - 5.00 % |
| Missing ALT Text % | 0.00 % | | - 0.00 % |
| Missing META Title? | false | | - 0.00 % |
| Missing META Description? | false | | - 0.00 % |
| Missing META Keywords? | false | | - 0.00 % |
| META Title Relevancy | 100.00 % | | - 0.00 % |
| META Description Relevancy | 40.00 % | | - 0.90 % |
| META Keyword Relevancy | 16.67 % | | - 0.83 % |
| Missing Header Tags? | true | | - 5.00 % |
| Is Keyword Stuffed? | false | | - 0.00 % |
| Penalty Factor | | | = -68.46 % |

1207 → # Unique Words on Webpage
1209 → % Incoming Paid Links'

FIG. 12B

Incoming Anchor Text

| Word | Associated LinkFlow™ |
|---|---|
| venice | 127.76 |
| chamber | 112.58 |
| area | 100.79 |
| district | 8.63 |
| historic | 8.63 |
| member | 1.50 |
| order | 0.36 |
| visitor | 0.36 |
| commerce | 0.22 |
| business | 0.21 |
| year | 0.21 |
| visit | 0.07 |
| florida | 0.04 |

FIG. 13B

Shingle Analysis

| Phrase | # of Occurrences |
|---|---|
| area chamber commerce | 3 |
| venice area chamber | 2 |
| activities business department | 1 |
| area member information | 1 |
| boating fishing golf | 1 |
| business department visit | 1 |
| business department visitor | 1 |
| chamber commerce enjoy | 1 |
| chamber commerce official | 1 |
| chamber commerce venice | 1 |
| chamber expo venice | 1 |
| chamber member activities | 1 |
| commerce enjoy boating | 1 |
| commerce official venice | 1 |
| commerce venice development | 1 |
| contact tri chamber | 1 |
| department visit venice | 1 |
| department visitor information | 1 |
| development area chamber | 1 |
| enjoy boating fishing | 1 |
| expo venice area | 1 |
| fishing golf thriving | 1 |
| florida area member | 1 |
| golf thriving venice | 1 |
| information business department | 1 |

| Penalties ✓✗ | | 1410 |
|---|---|---|
| Penalty Description | Penalty Score | Penalty Multiplier on Gross Link Flow™ |
| Link Order on Webpage: | # 3 | × 99.00 % |
| Anchor Text Font Size: | 16.00 px | × 52.00 % |
| Reciprocal?: | false | × 100.00 % |
| Editorial?: | false | × 30.00 % |
| Relevance: | Very Relevant | × 100.00 % |
| # of Duplicate Anchor Text on Webpage: | 0 | × 100.00 % |
| # of Duplicate Anchor Text to Webpage: | 1 | × 100.00 % |
| % Link Flow™ Share to be Considered: | | = 15.36 % |
| Penalty Score: | | −84.64 % |

Website Dashboard → Webpage Scorecard → All Outgoing Links → Link Scorecard  (0.1 seconds)

Webpage From: http://www.venicechamber.com/
Webpage To: http://www.venicechamber.com/LinkClick.aspx?link=65&tabid=36
  View This Link
Statistics as of: 11-16-2008 00:06:42 EST

1400

| Summary | Detailed Penalties | Alerts | Create SEOENG Rules™ | Repair Station | Link Details |

| SEOENG™ Link Details  1420 | |
|---|---|
| Net Link Flow™ Share | 64.5+ |
| Anchor Text | <img height="184" alt="Click to Find Chamber Member Information and Activities" hspace="0" width="294" border="0" src="/Portals/0/PHOTO_teaserChamber.jpg |
| Font Size | 16.00 px |
| Had Session Id? | false |
| Nofollowed? | false |
| Reciprocal? | false |
| Broken? | false |
| Dangling? | false |
| Editorial? | false |

Download Your Custom SEOENG™!

Directions:

Add this powerful customized SEOENG™ Search Bar tool to your Website.
Simply select a design from the options below, then copy and paste the corresponding code on any Webpage to enable visitors to search your own customized version of SEOENG™ directly from your Website!

SEOENG™ Mini Search Bar

➡ What your visitors will see:

| http:// | SEOENG Search | —{SEOENG}◾
powered by

➡ Add this Code to your Website for SEOENG™ Mini Search Bar:

Click to Select:

```
<!--*****************************
* START SEOENG SEARCH FORM
*
* Subject to SEOENG Terms of Service (TOS) found at
* 'http://learn.seoeng.com/terms.htm'.
*
* Do not modify or alter this Search Bar in any way.  Must be displayed
* as shown at:
*
* 'http://www.seoeng.com/seoeng-form.htm'
*
* Copyright © 2001-2008 SEOENG LLC. All rights reserved. Patent Pending.
-->
<form method="post" action="http://search.seoeng.com/"
enctype="application/x-www-form-urlencoded">
<input type="hidden" name="externalSearchForm" value="" />

<input type="hidden" name="affiliateId" value="206" />
```

NAVIGABLE WEBSITE ANALYSIS ENGINE

CROSS-REFERENCE TO RELATED APPLICATIONS

This application is a continuation application of and claims the benefit of priority from U.S. application Ser. No. 12/273,004, entitled "NAVIGABLE WEBSITE ANALYSIS ENGINE," and filed on Nov. 18, 2008, which is a non-provisional application of U.S. Provisional Application No. 60/988,810, entitled "SEARCH ENGINE OPTIMIZATION ENGINE," and filed on Nov. 18, 2007. The content of the aforementioned applications is incorporated herein by reference in its entirety.

FIELD OF ART

Aspects of the invention generally relate to analyzing a network document. More specifically, aspects of the invention provide methods and systems for evaluating a network document and providing transparency into the manner in which the network document is analyzed and scored by a search engine. Thus, a user may view and navigate a network from the perspective of a search engine.

BACKGROUND

Providing quality search results on a search engine can be a complex process. Analyzing a given document on a network such as the Internet to determine its relation to other documents on the network requires millions of calculations, with each calculation attempting to model human perception as a mathematical or logical formula. Because of this complexity, website and other network document owners, whose webpages and other documents are the subject of these calculations, are often unable to fully appreciate and understand how and why their webpages or network documents are scored by search engines. Without a clear understanding of the analysis and scoring mechanism, publishers of websites and other network documents might not be able to capitalize on the ability of search engines to attract users to their websites.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to some aspects of the present disclosure, an optimization engine may provide a transparent and navigable interface through which website publishers (and other network document publishers) may view and understand how a website or other network document is scored by a search engine. Thus, a user may be able to examine a desired level of scoring detail by selecting a corresponding factor used in the scoring analysis. In one example, a user may review how links embedded in the user's website affect the website's score by viewing the scoring methodology and data for those links. Statistics may also be provided to further illustrate how scores are derived.

According to another aspect, the optimization engine may provide suggestions for raising a search engine score for a website or other network document. Based on the optimization engine's analysis, potential areas for improvement may be identified and methods for making such improvements may be generated. Once changes are made to the website, the user may immediately see the difference in score by requesting an on-demand re-analysis (or re-crawl) of the website.

According to yet another aspect, users may be able to set alerts for when a website's score, a sub-score or some other analysis factor reaches a specified threshold. For example, a user may request an alert be sent if and when the number of broken links on a website exceeds two.

BRIEF DESCRIPTION OF THE DRAWINGS

Certain embodiments are illustrated by way of example and not limited in the accompanying figures in which like reference numerals indicate similar elements and in which:

FIGS. 6A and 6B illustrate a navigation map for an optimization engine according to one or more aspects described herein.

FIGS. 11C and 11D illustrate example rule creation interfaces according to one or more aspects described herein.

FIGS. 12A-12D illustrate interfaces of an example webpage scorecard according to one or more aspects described herein.

FIGS. 13A-13C illustrate interfaces of an example market focus analysis page according to one or more aspects described herein.

FIGS. 14A-D illustrate interfaces of a link scorecard according to one or more aspects described herein.

FIG. 15 illustrates an example dialog box providing suggestions for improving a webpage or network document according to one or more aspects described herein.

FIGS. 22A-B illustrate private branding of an optimization engine interface according to one or more aspects described herein.

FIGS. 24A-D illustrate example interfaces for creating and customizing a privately branded optimization engine according to one or more aspects described herein.

FIG. 28 illustrates an example external incoming link report according to one or more aspects described herein.

One or more of the drawings include registered trademarks such as SEOENG™ and Search Engine Optimization Engine®. Other trademarks may also appear in one or more drawings.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
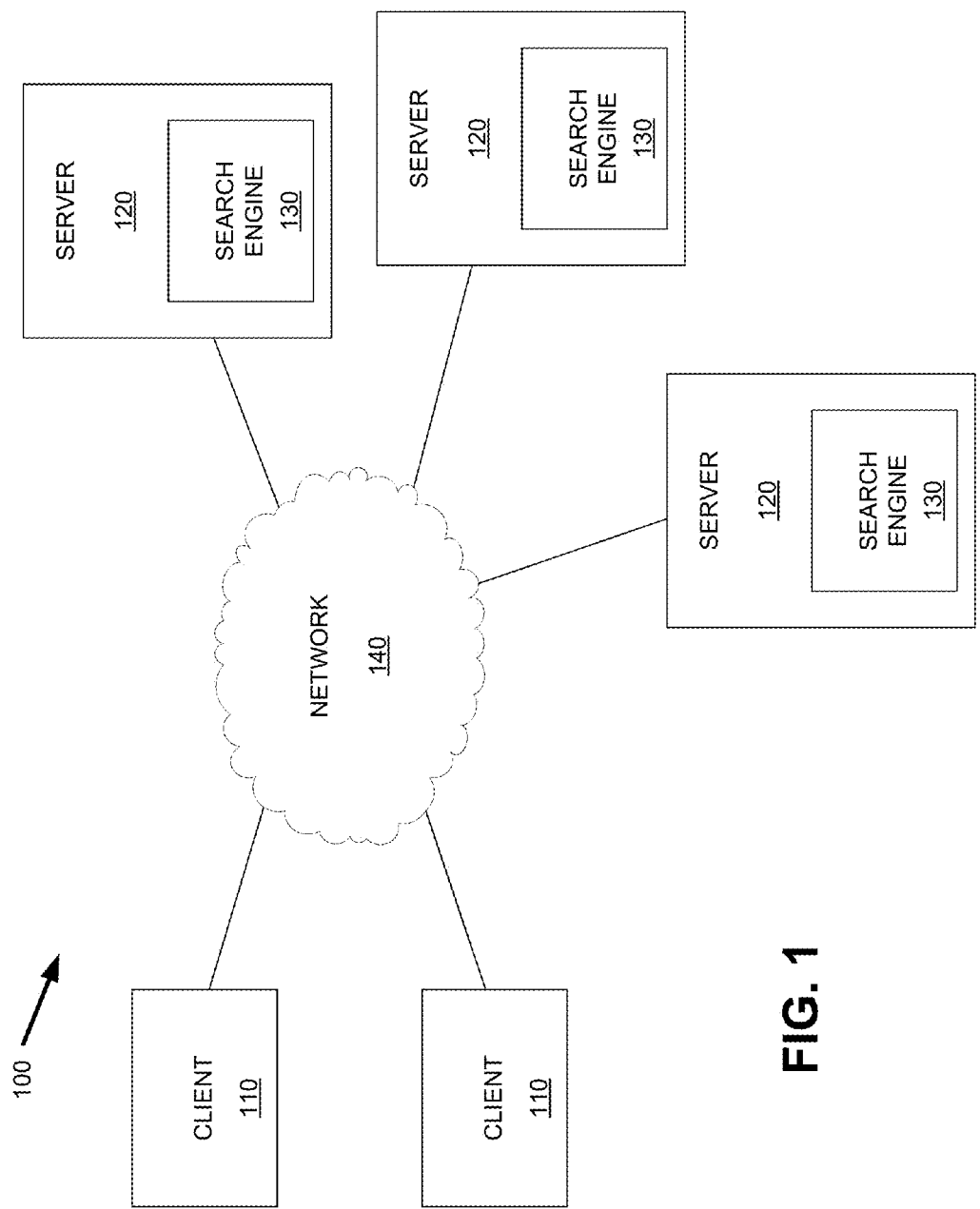
FIG. 1 illustrates a block diagram of an example communication network in which one or more embodiments may be implemented.

FIG. 1 illustrates a network environment 100 in which aspects described herein may be used. Environment 100 may include multiple client devices 110 connected to multiple servers 120 via a network 140. The network 140 may include wired or wireless connections and networks such as a local area network (LAN), a wide area network (WAN), a telephone network, such as the Public Switched Telephone Network (PSTN), an intranet, the Internet, or a combination of networks. Two client devices 110 and three servers 120 have been illustrated as connected to network 140 for simplicity. In practice, there may be more or fewer client devices and servers. Also, in some instances, a client device may perform the functions of a server and a server may perform the functions of a client device. The client devices 110 may include data processing machines, such mainframes, minicomputers, personal computers, laptops, personal digital assistants, mobile phones or the like, capable of connecting to the network 140. The client devices 110 may transmit data over the network 140 or receive data from the network 140 via a wired, wireless, or optical connection.

Figure 2:
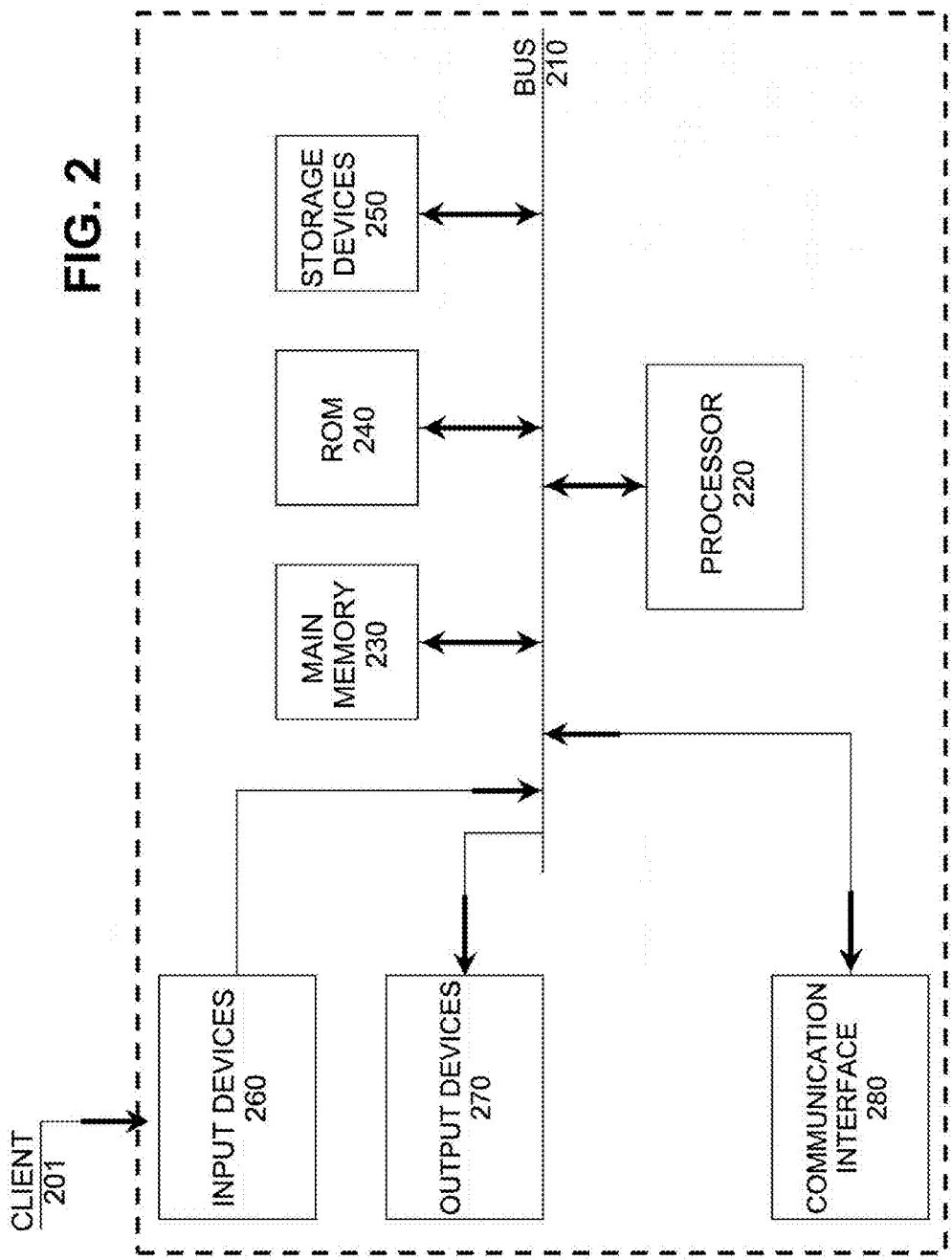
FIG. 2 illustrates a block diagram of an example computing environment in which one or more aspects described herein may operate.

FIG. 2 illustrates an exemplary client device, e.g., device 110 of FIG. 1. The client device 201 may include a bus 210, a processor 220, a main memory 230, a read only memory (ROM) 240, a storage device 250, an input device 260, an output device 270, and a communication interface 280. The bus 210 may include one or more conventional buses that permit communication among the components of the client device 201. The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive. The input device 260 may include one or more conventional mechanisms that permit a user to input information to the client device 201, such as a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 201 to communicate with other devices and/or systems. For example, the communication interface 280 may include mechanisms for communicating with another device or system via a network, such as network 140 of FIG. 1.

As will be described in detail below, the client devices 201 may be configured to perform searching-related operations. The client devices 201 may perform these operations in response to processor 220 executing software instructions contained in one or more computer-readable media, such as memory 230. A computer-readable medium may be defined as one or more memory devices. The software instructions may be read into memory 230 from another computer-readable medium, such as the data storage device 250, or from another device via the communication interface 280. The software instructions contained in memory 230 causes processor 220 to perform search-related activities described below. Alternatively, hardwired circuitry (e.g., application specific integrated circuits) may be used in place of or in combination with software instructions. Thus, aspects described herein are not limited to any specific combination of hardware, firmware and/or software.

Referring again to FIG. 1, the servers 120 may include one or more types of computing devices such as a mainframe, a minicomputer, or a personal computer, capable of connecting to the network 140 and to communicate with the client devices 110. In alternative implementations, the servers 120 may include mechanisms for directly connecting to one or more client devices 110. The servers 120 may transmit data over network 140 or receive data from the network 140 via a wired, wireless, or optical connection. The servers may be configured in a manner similar to that described above in reference to FIG. 2. Additionally, the server 120 may include a search engine 130 usable by the client devices 110. The servers 120 may further store network documents such as webpages accessible by the client devices 110.

Figure 3:
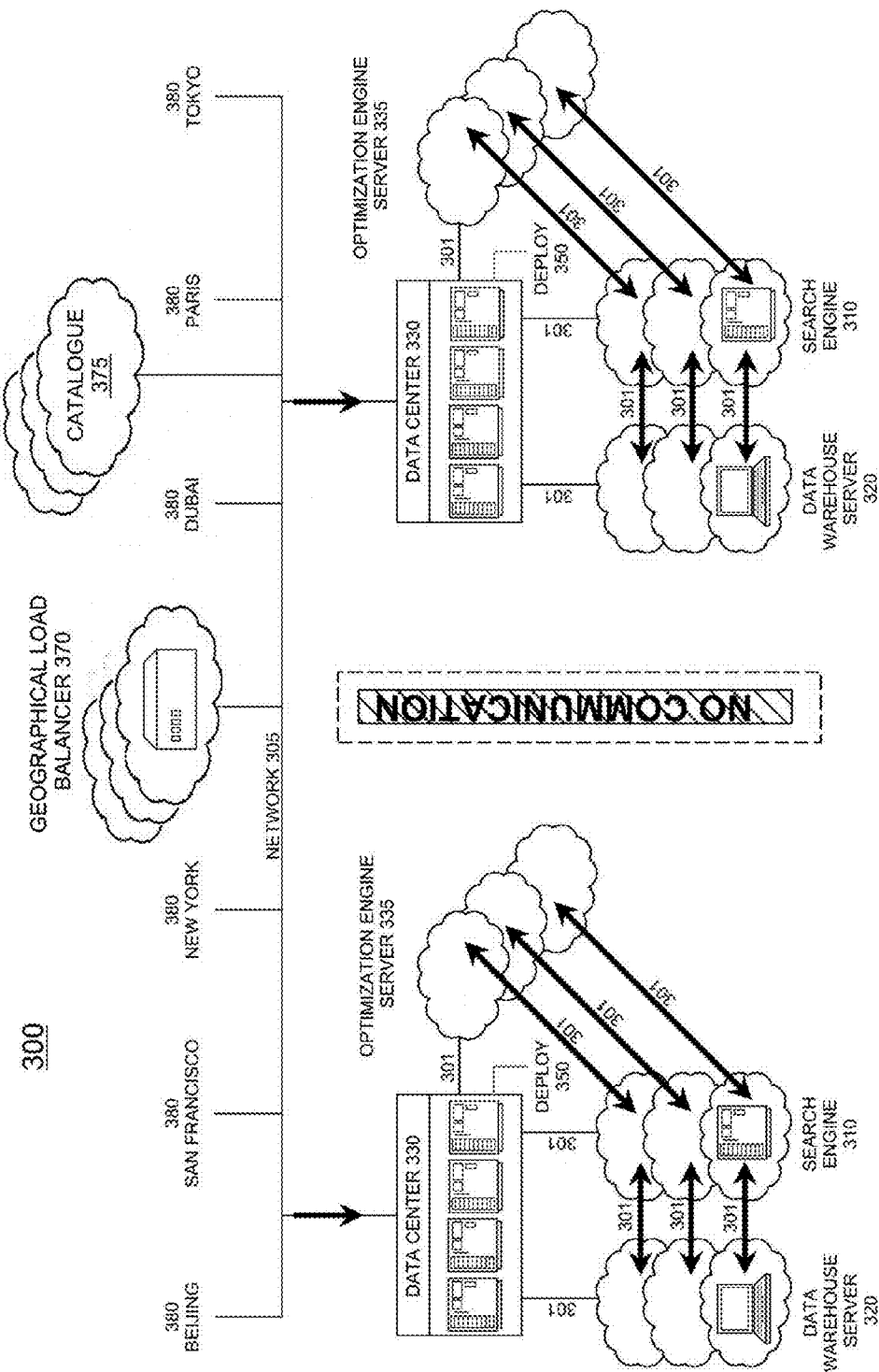
FIG. 3 illustrates an example network diagram of optimization engines operating in a global environment according to one or more aspects described herein.

FIG. 3 illustrates a global network infrastructure having search engines and optimization engines (e.g., SEOENG™ optimization engine). The global network infrastructure 300 includes network 305 (e.g., the Internet) that is configured to connect clients 380 located across multiple locations such as Beijing, San Francisco, New York, Dubai, Paris and Tokyo, to each other and to search engine data centers 330. A load balancer 370 may also be included in the network 305 to distribute search engine and/or data requests according to the relative processing loads of data centers 330. Each of search engine data centers 330 may include one or more servers and may be located in different geographic locations. For example, search engine data centers 330 may each include a data warehouse server 320 for storing copies of data from the network 305 (e.g., copies of websites and other network documents), a search engine server 310 for processing search queries and a search engine optimization server 335 configured to provide search engine optimization tools. Alternatively, each of servers 310, 320 and 335 may operate independently instead of in combination as a single data center. In independent operation, servers 310, 320 and 335 may still access services and/or data provided by each of the other servers through communication channels 301. For example, search engine optimization server 335 may request data from search engine server 310 to provide suggestions for improving a particular website or network document. A website, as used herein, generally refers to a grouping of any set of webpages and or network documents. Accordingly, a website might not be limited to just a subdomain. In another example, search engine server 310 may access copies of network websites stored in data warehouse server 320 to provide search results in response to a query. Each data center indirectly communicates via the catalogue 375 to facilitate shared nothing architecture. Shared nothing architecture reduces the communications bandwidth needed for a massively parallel search engine. In particular, catalogue 375 may be configured to control which data center a user interacts with. Catalogue 375 may track which data center is responsible for which part of the Internet and may also be responsible and configured for storing user settings. Catalogue 375 may be configured to manage communications such as search queries or optimization requests from clients 380 and to distribute those requests to the appropriate server.

Each of search engine data centers 330 including servers 310, 320 and 335 may be controlled by a deployment infrastructure 350. In particular, deployment infrastructure 350 may be configured to manage software or firmware updates and may be responsible for configuring or upgrading servers. In one or more configurations, commands, requests and other communications may be received from client 380 via the network 305 on a proprietary communications channel (non-public). Additionally or alternatively, each of data centers 330 may operate independently of one another (i.e., without needing to communicate with each other) through the use of catalogue 375.

Figure 4:
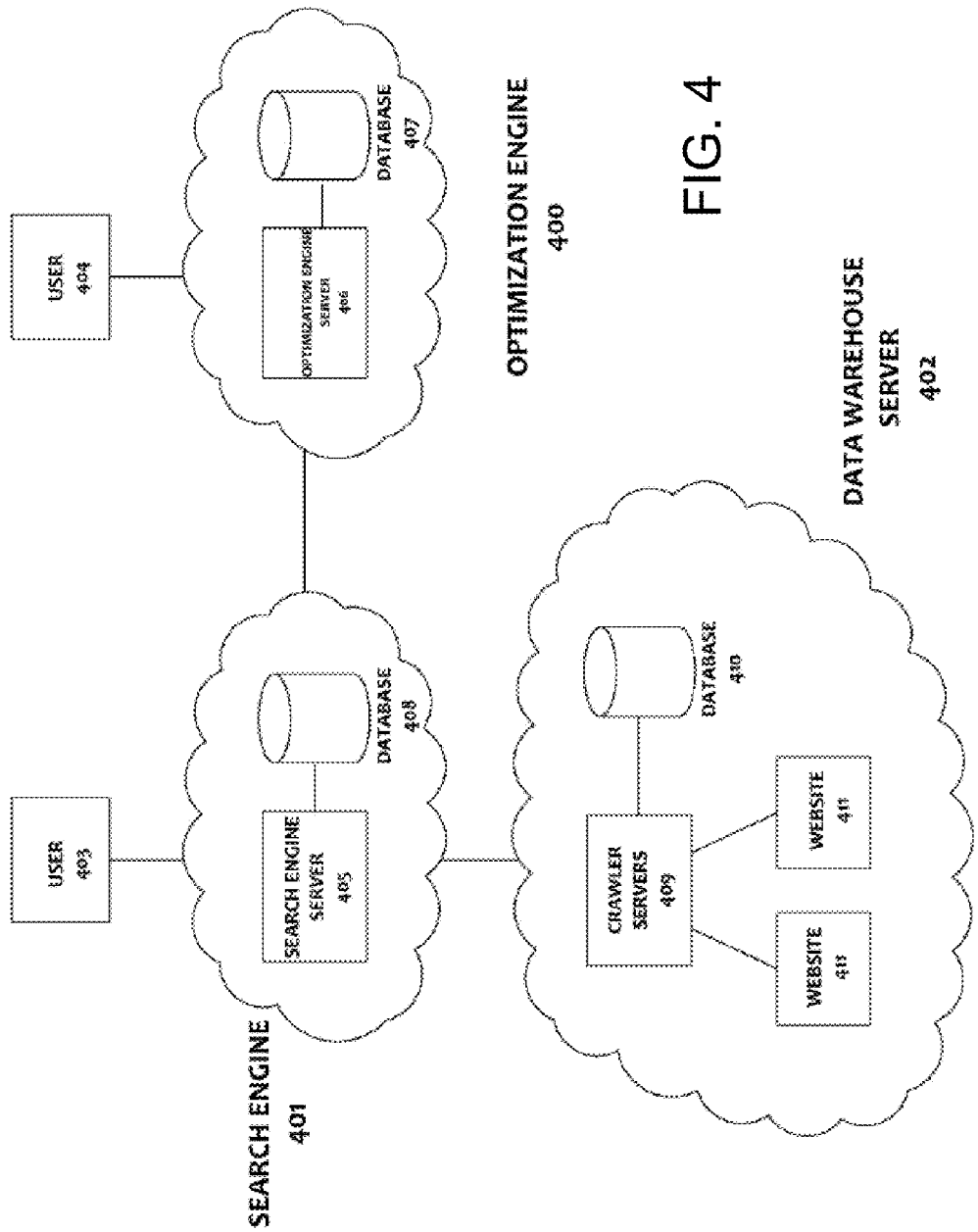
FIG. 4 illustrates a block diagram of an example optimization engine according to one or more aspects described herein.

FIG. 4 illustrates a simplified block diagram of an example optimization engine operating environment. In the environment, optimization engine 400 includes a search engine optimization server 406 through which user 404 may interact with optimization engine 400, e.g., to specify a webpage, website, or link he or she wishes to explore. Optimization engine 400 may comprise a real-time interface which allows the user 404 to navigate the search engine 401 data and retrieve it on-demand. Optimization engine 400 may further be configured to generate suggestions, alerts, and to trigger re-crawls. The optimization engine server 406 may pass queries on to search engine 401 that retrieves information from database 408 as well as crawler servers 409. Search engine server 401 is configured and responsible for sorting, indexing, and scoring webpages. Search engine 400 may function with typical search engine behavior using the raw data from the data warehouse server 402. Optimization engine 400 is a cipher for search engine 401, allowing the user (e.g., user 404) to navigate the data stored in database 408 in a comprehensible and informative format. Database 407 may be configured to store historical information such as previous versions of websites, historical webpage statistics, other META data derived from search engine 401 and the like. Crawler servers 409 may be an automated module that is configured to crawl through websites 411 and obtain relevant search engine data such as content and link information. Crawler servers 409 may be configured to crawl a network of websites or webpages on a predefined schedule or in an on-demand fashion or both. Results of the queries from user 404 or user 403 may be transmitted from search engine 401 to search engine optimization server 406 to generate results for the user's review and perusal. Accordingly, optimization engine 400 may decode or translate the data and processing performed by search engine 401 into user friendly information, statistics, recommendations and the like.

Figure 5:
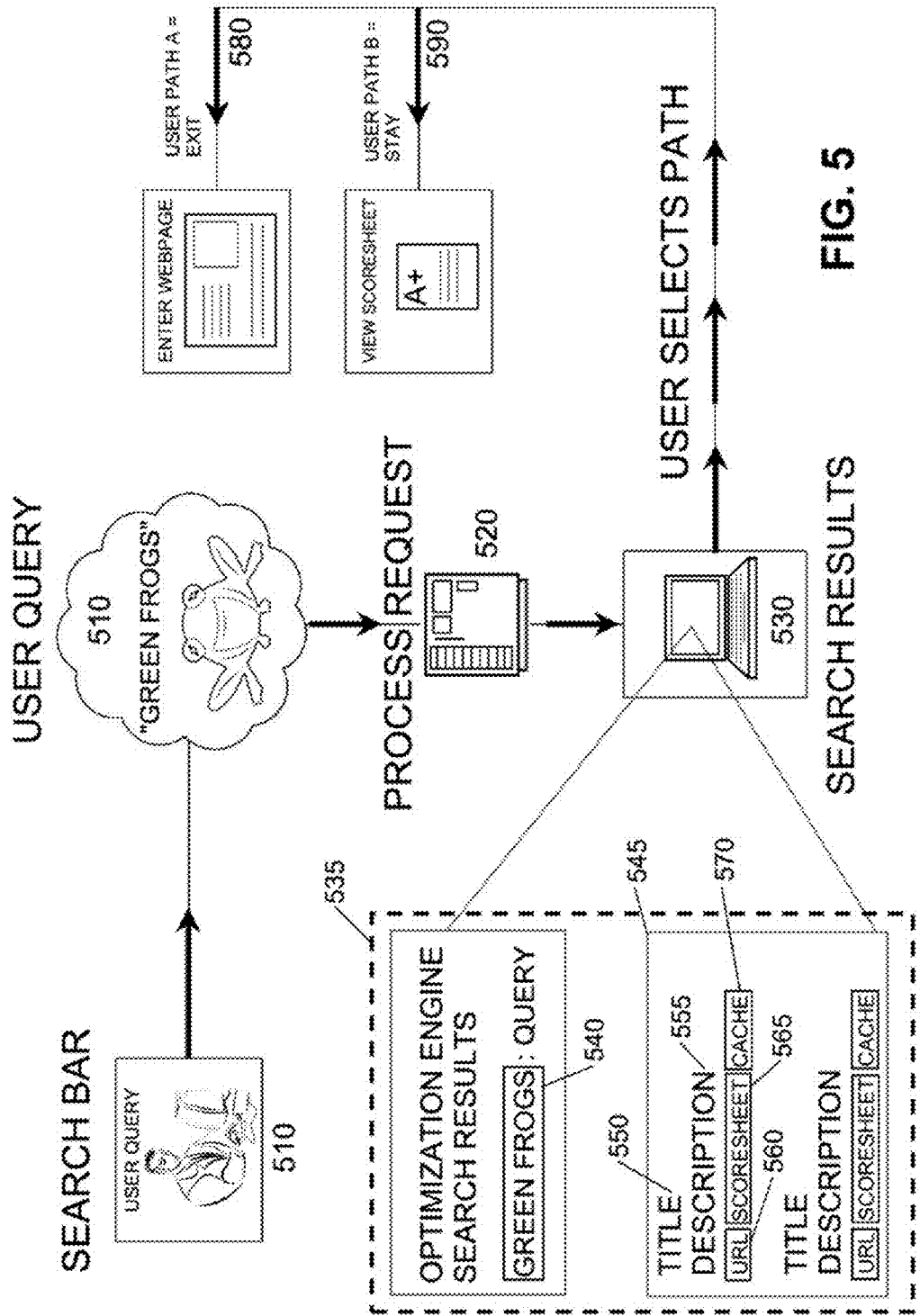
FIG. 5 illustrates an example data flow for processing a search query according to one or more aspects described herein.

FIG. 5 illustrates a flow diagram for providing navigation into a search engine via search results. Initially, a user may enter 510 a search query such as a phrase. For example, the user query may be the phrase "green frogs." The search query may then be processed 520 by a search engine to generate results that match or have some level of relevance to the specified query. Various methods for determining relevance of a webpage to a query may be used. Once the search results have been generated, the results may be presented 530 to the user for review. In one arrangement, the search results may be displayed as in results page 535. Results page 535 includes a search bar 540 indicating the search phrase or query that was specified. In addition, page 535 includes a results listing 545 in which each result is identified by a title 550, a description 555, a uniform resource identifier (URI) 560 such as a URL, an optimization engine scoresheet 565 and a cache option 570. Cache option 570 allows a user to retrieve a webpage or network document that was previously cached on a specified date and at a specified time (i.e., versus retrieving the live or current webpage or network document). Using the cache option 570 may be quicker because the search engine might not need to query the actual website for the newest data. To enter the website 580, a user may select the title 550, the description 555 or the uniform resource identifier 560. Alternatively, if the user wishes to view 590 an optimization engine scoresheet of the website, the user may select scoresheet option 565. Results page 535 is but an example of how a results listing may be presented and is not intended to limit the possible configurations of result pages.

Figure 6A:
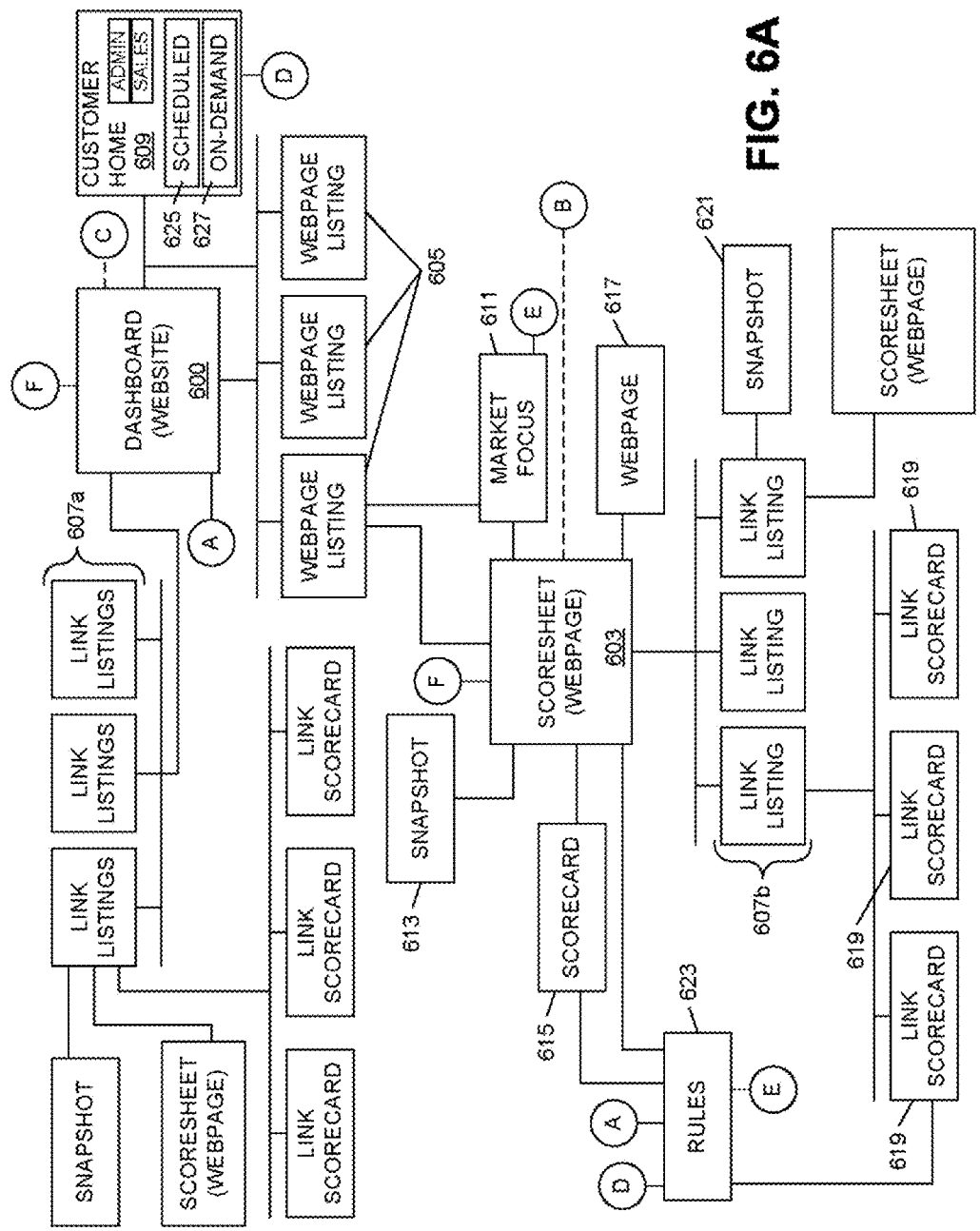

FIGS. 6A-6B illustrates an example diagram for navigating an optimization engine. Initially, referring to FIG. 6A, a user may enter a URL for a website or network document that is to be analyzed by the optimization engine. Upon entering the URL, a webpage scoresheet 603 may be displayed and the user may navigate to a website dashboard 600 which may be displayed. The website dashboard 600 may include overview information such as website statistics, link statistics, crawl statistics, alerts, reports and other META data such as robots.txt associated with the website. From the dashboard 600, a user may navigate to listings of webpages 605 in the website, listings of links (e.g., outgoing, incoming) 607 in the website and a rules creation interface 623. From a listing of webpages 605, a user may access a webpage's scoresheet 603 or market focus details 611. Each webpage may have its own scoresheet based on its content. From scoresheet 603 a user may access market focus information 611, a webpage snapshot 613, a detailed scorecard 615 and/or the actual webpage 617 or dashboard 600. The user may also access a rules creation interface 623, listings of webpages 605 and listings of links 607. From the listing of links 607, a user may further navigate to link scorecards 619 corresponding to each link and a link snapshot 621. Listings of links 607a may include links that are resident in any webpage of the website while listing of links 607b may include links that are resident in the webpage to which scoresheet 603 corresponds. Link snapshot 621 allows a user to view where the link exists in the webpage being analyzed while link scorecards 619 provides an analysis of the link as it pertains to the webpage's score. Additionally, a rule creation page or interface 623 may be provided to the user from scorecard 615 or 619, scoresheet 603, market focus 611 or customer home 609. Rule creation interface 623 allows a user to define custom rules to trigger alerts or events. Further details relating to rule creation interfaces is provided below. Customer home 609 may be a customizable interface that provides a user with an entry point into one or more website dashboards or webpage scoresheets. Through customer home 609, the user may also configure alerts and may configure re-crawls that are either on-demand 627 or scheduled 625.

Referring to FIG. 6B, calculation boxes 629 may be configured to calculate scores and provide analyses of webpages and websites. In one or more arrangements, optimization engine servers 406 of FIG. 4 may embody calculation boxes 629. Scores may be pre-calculated or may be calculated on an on-demand basis. In one configuration, a queue 633 may be used to schedule the processing of requests for re-analysis or re-scoring. Queue 633 may be viewable from either a dashboard 631 or a scoresheet 635 so that a user may determine when he or she may expect an updated or new analysis.

From any of the above pages, a trackback tool may be provided in a header or other portion of the display to allow the user to go back to a previous section of the optimization engine. For example, from market focus information 611, a user may be able to track back to website dashboard 600 or scoresheet 603. The navigation flow illustrated in FIGS. 6A and 6B is but an example of how users may navigate through the content of an optimization engine and is not intended to limit possible navigation flows.

Figure 7A:
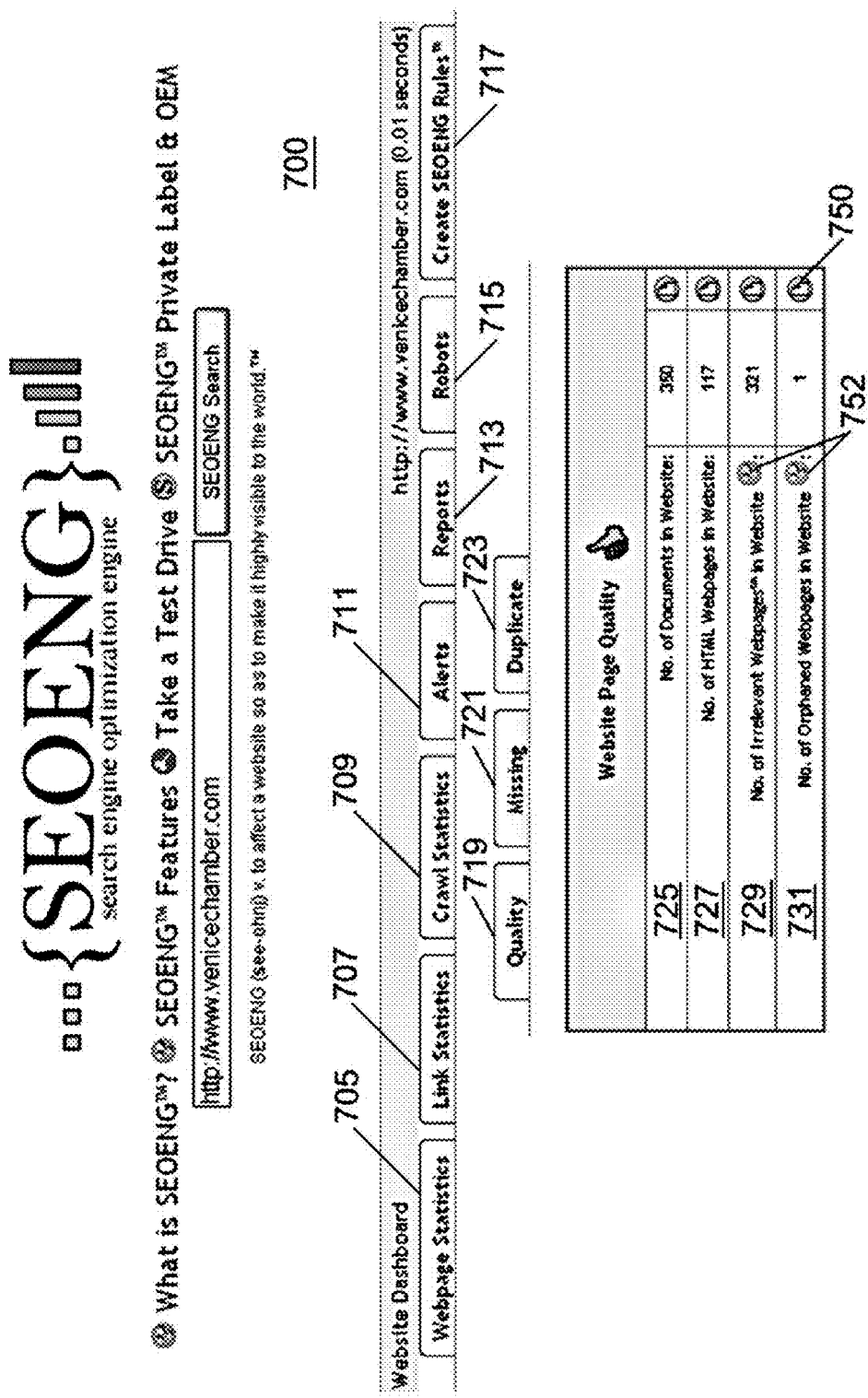
FIGS. 7A-7P illustrate portions of an optimization engine dashboard interface according to one or more aspects described herein.

FIGS. 7A-F illustrate portions of an example website dashboard interface that may be presented to a user over a network for display on a display device at the user's location. Referring to FIG. 7A, for instance, dashboard interface 700 includes a search bar 703 where a user may enter a URL corresponding to a website they wish to analyze for optimization purposes. The dashboard 700 may include webpage statistics 705, link statistics 707, crawl statistics 709, alerts 711, reports 713, robots 715 and rule creation option 717. Rule creation option 717 allows a user to create triggers to alert a user whenever the rule is triggered, or perform some specified action. Webpage statistics 705 provides information relating to website page quality 719, missing website information 721 and duplicate information 723. This information may affect the website's score. Website page quality 719, in particular, includes an analysis of a number of documents in the website 725, a number of HTML webpages in the website 727, a number of irrelevant webpages in the website 729 and a number of orphaned webpages in the website 731. The number of documents in the website 725 may refer to all documents regardless of whether they are webpages, WORD documents, PDF files or the like. Number of HTML webpages 727, on the other hand, might only count those pages that are HTML pages. A webpage may be considered irrelevant if the webpage does not have a sufficiently high webpage score. A webpage score is the result of the total LINK FLOW minus the penalties associated with the webpage. This process is shown on the webpage scorecard. LINK FLOW is discussed in further detail later in this document. Orphaned webpages, on the other hand, refer to webpages or network documents to which an external (i.e., not in the same website) incoming link points, but which is not referred to by a webpage of the website in which the webpage exists. Thus, a user may be able to navigate to the webpage from an external website, but not from the website in which it is actually stored. Other scoring systems may be used instead of or in addition to webpage score or LINK FLOW. For example, node ranking as described in U.S. Pat. No. 6,285,999 may be used instead of LINK FLOW.

Figure 7B:

Referring to FIG. 7B, missing website information 721 includes information such as a number of missing META titles in a website 732, a number of missing META descriptions in the website 733 and a number of missing META keywords in the website 735. A META title refers to the text that a user will see at the top of a web browser for a given webpage or network document. Typically, a META title is defined in HTML using the <title> </title> tags. META descriptions, on the other hand, refer to words, phrases and descriptions that define the content of the underlying webpage or network document. Using HTML, META descriptions may be specified as follows: <META NAME="Description" CONTENT="description">. META keywords correspond to terms describing the theme or context of the webpage or network document. Using HTML, META keywords may be specified as follows: <META NAME="keywords" CONTENT="keywords">.

Duplicate website information 723 includes a number of duplicate META titles 737, duplicate META descriptions 739, duplicate META keywords 741, duplicate MARKET FOCUS 743, duplicate URL spellings 745 and exact duplicate webpages in the website 747 as illustrated in FIG. 7C. Duplicate MARKET FOCUS 743, for example, relates to the grouping of categories or contexts associated with a website or webpage. MARKET FOCUS 743 may be determined by the search engine. Duplicate META title 737 refer to webpages in the website that have the same META title while duplicate META descriptions 739 and META keywords 741 refer to webpages having the same META description or keywords, respectively. Duplicate URL spellings 745, on the other hand, refers to URLs that are spelled the same but with different capitalization.

Figure 8:
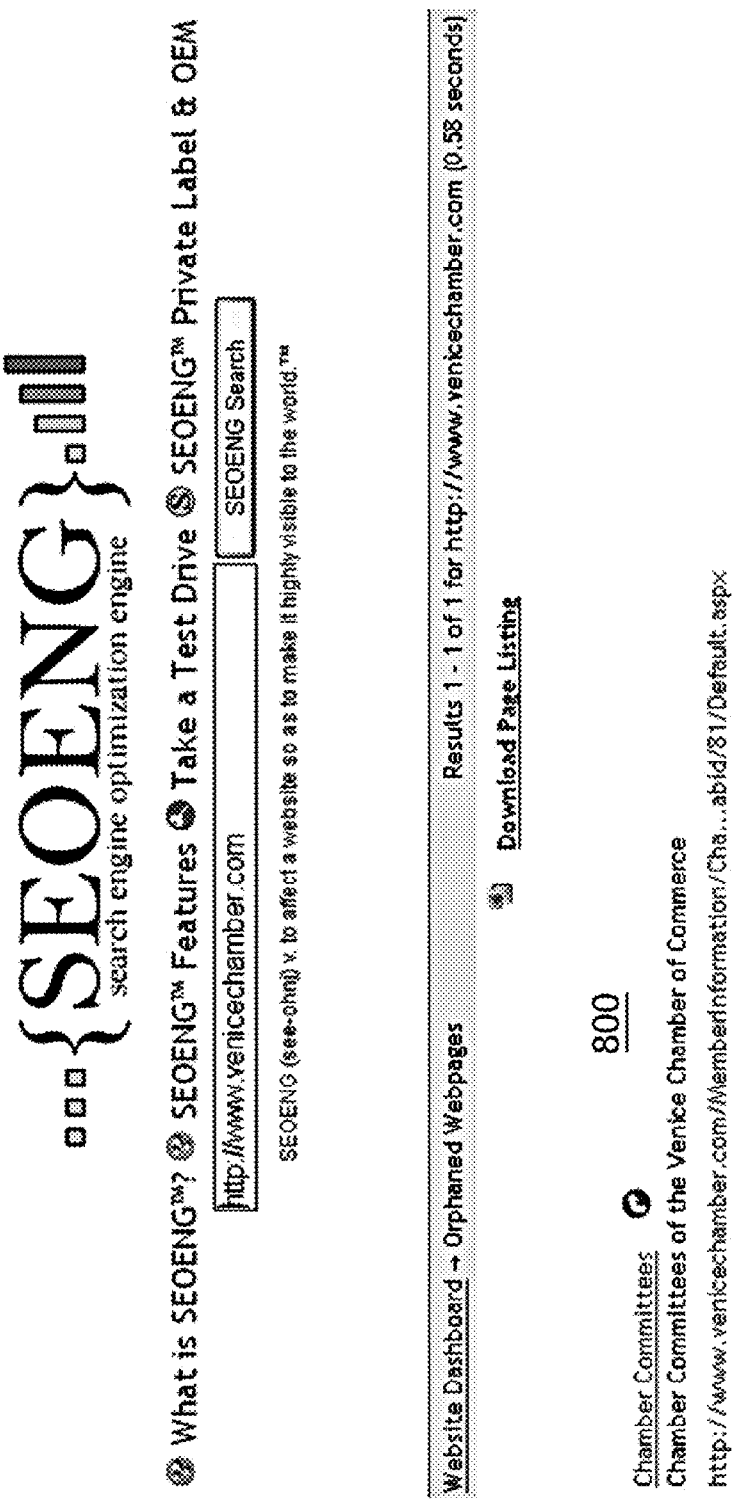
FIG. 8 illustrates an example listing of orphaned webpages according to one or more aspects described herein.

For each of the above analysis factors, an option such as page listing option 750 may be provided to display a list of the webpages or network documents that contributed to that factor. For example, in FIG. 7A, the number of orphaned webpages 731 may include option 750 that identifies the orphaned webpage(s). FIG. 8 illustrates an example orphaned webpage listing 800.

Additionally or alternatively, various terms or phrases may be foreign to a user. Accordingly, such terms or phrases may include an interactive indicator (such as a question mark) that a user may select to obtain a definition or further understanding. For example, in FIG. 7A, the number of irrelevant webpages 729 and the number of orphaned webpages 731 include indicator 752. Upon selecting indicator 752, the user may be directed to an explanation page or provided with a pop-up window with further details about the corresponding term or phrase. In one example, selecting indicator 752 may take the user to a corresponding learning center page containing information and directions relating to how, what, and why he or she needs to make changes indicated or address the issues identified. Indicators such as indicator 752 may be provided throughout the various interfaces of an optimization engine.

Figure 7D:
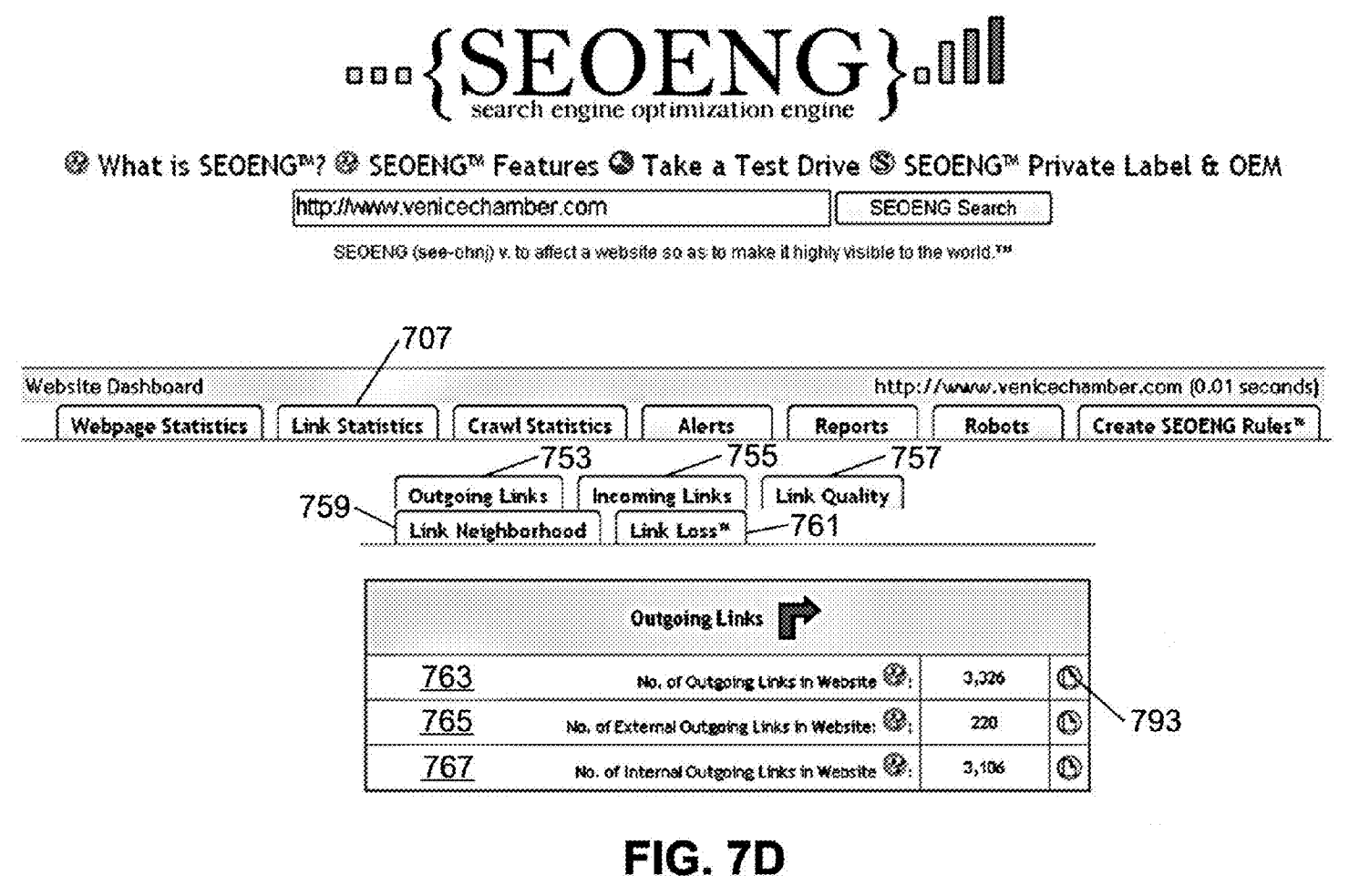

Referring now to FIG. 7D, link statistics section 707 provides information such as outgoing link analysis 753, incoming link analysis 755, link quality 757, link neighborhood 759 and LINK LOSS 761. Outgoing link analysis 753 provides information that includes a number of outgoing links in the website 763, number of external outgoing links in the website 765, and number of internal outgoing links in the website 767. Outgoing links refer to links that are directed to other webpages (i.e., not a link within the webpage), while the number of external outgoing links 765 refers to the number of links to webpages outside of the website. Number of internal outgoing links 767, on the other hand, refers to the number of links directed to webpages within the website. Generally, the number of external outgoing links 765 added to the number of internal outgoing links the website 767 will equal the number of outgoing links 763.

Figure 7E:

In FIG. 7E, incoming links analysis 755 provides similar data, except that it refers to incoming links. For example, analysis 755 includes number of total incoming links 767, number of external incoming links 769 and number of internal incoming links 771. The number of total incoming links 767 refers to the total number of links from other pages and websites to pages in the website. The number of external incoming links 769 refers to the number of links from other websites to pages in the website while the number of internal incoming links 771 refers to the number of links from pages in the website to other pages in the website.

Link quality analysis 757 displays factors that contribute to the value and strength of links in the website as illustrated in FIG. 7F. Thus, link quality analysis 757 might include a number of broken links 773 (i.e., links that do not lead to a valid destination), number of dangling links 775 (i.e., links to non-indexable or webpages that do not have any followable links), number of nofollow links 777 (i.e., links tagged with the rel=nofollow attribute) and number of non-editorial links 779. Non-editorial links 779 refer to links that were not mentioned in the context of writing about a particular subject matter that was of importance to the webpage being linked to.

Figure 7G:

In FIG. 7G, Link neighborhood 759 provides information such as an average LINK FLOW of external webpages linking to the website 781 and an average LINK FLOW of external webpages linked from the website 783.

Figure 7H:
Figure 71:
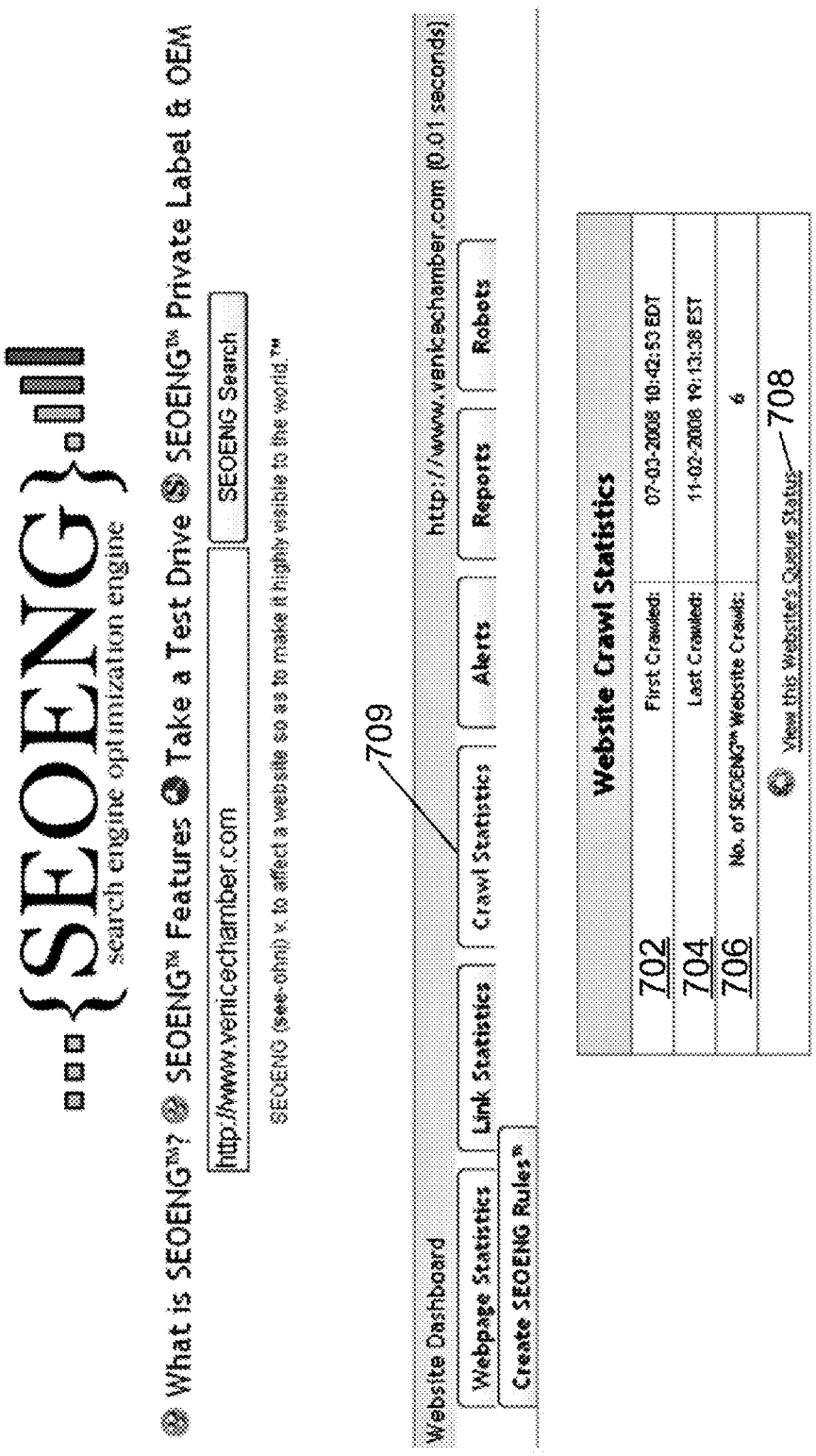

Finally, with respect to FIG. 7H, LINK LOSS 761 shows a user a website's total internal incoming LINK LOSS score 785, total external incoming LINK LOSS score 787, total external outgoing LINK LOSS score 789 and a total LINK LOSS score 791. LINK LOSS refers to a condition which is caused by inefficient linking Factors contributing to a LINK LOSS score include external outgoing links, dangling links and orphaned webpages. External LINK LOSS refers to LINK FLOW that is being sent out to other websites while internal LINK LOSS is LINK FLOW that is not being preserved in a website due to its internal linking structure. For websites, total internal LINK LOSS is calculated by subtracting the total internal LINK FLOW from the maximum theoretical total LINK FLOW, which is, in turn, determined by the formula 1*the number of webpages in that website or set of webpages.

Figure 9:
FIG. 9 illustrates an example listing of outgoing links according to one or more aspects described herein.

For one or more of the above link statistics factors, an option may include an option for displaying links that contributed to the factor score. For example, referring to FIG. 7D, number of outgoing links 763 may include option 793 that displays a listing of outgoing links. FIG. 9 illustrates a listing of outgoing links. Each link listing, e.g., link listing 901 may include a view link option 903 which highlights the link in the corresponding webpage or network document and a view link scorecard option 905. Link scorecards are discussed in greater detail below.

Figure 10:
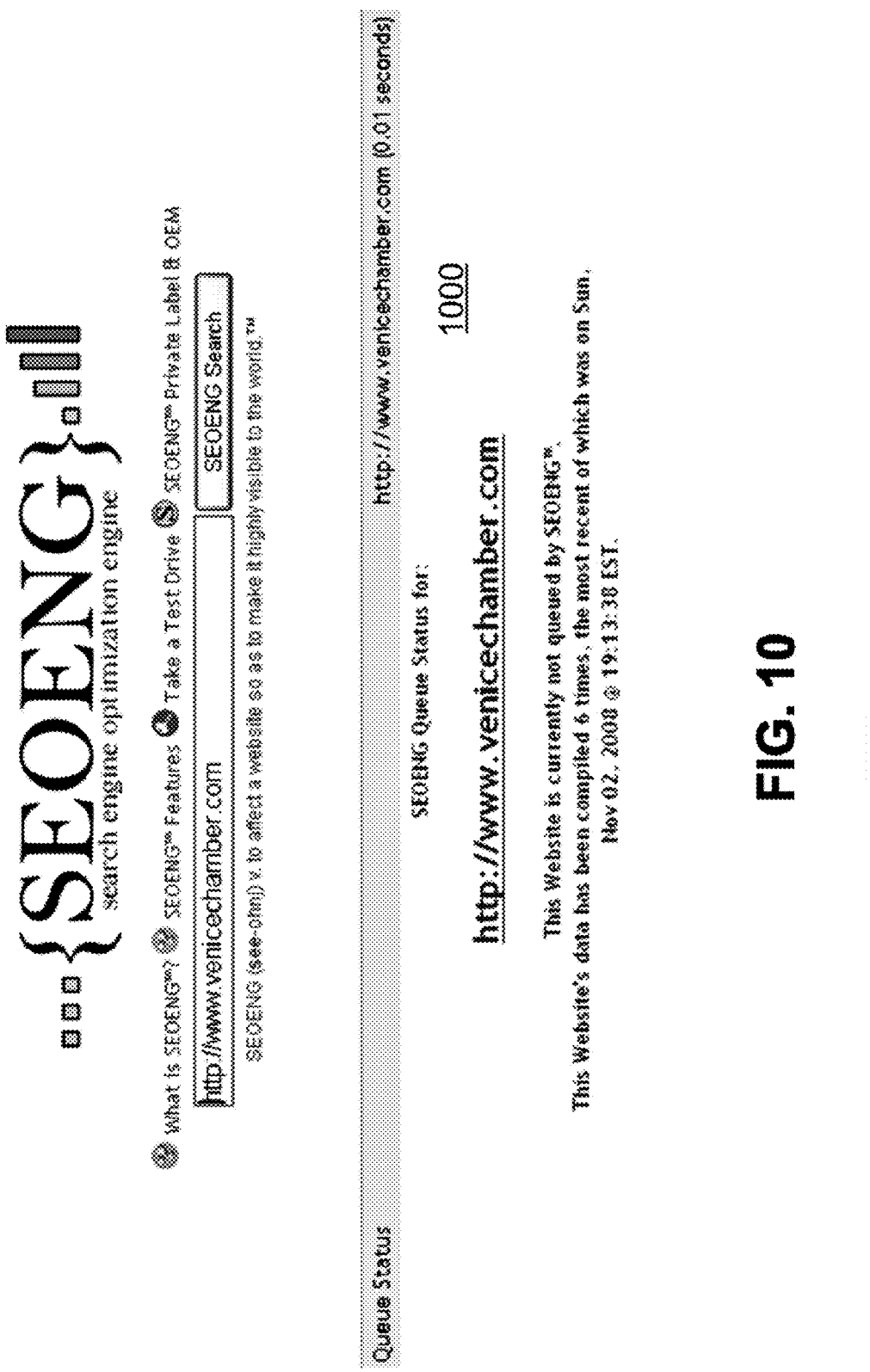
FIG. 10 illustrates an example crawl queue status page according to one or more aspects described herein.

Referring to FIG. 7I, webpage crawl statistics 709 provides information such as a first crawled date and time 702, a last crawled date and time 704 and a number of crawls that have occurred 706. An option 708 may be provided that displays the website's status in a crawl queue. FIG. 10 illustrates an example crawl queue status page 1000.

Figure 7J:
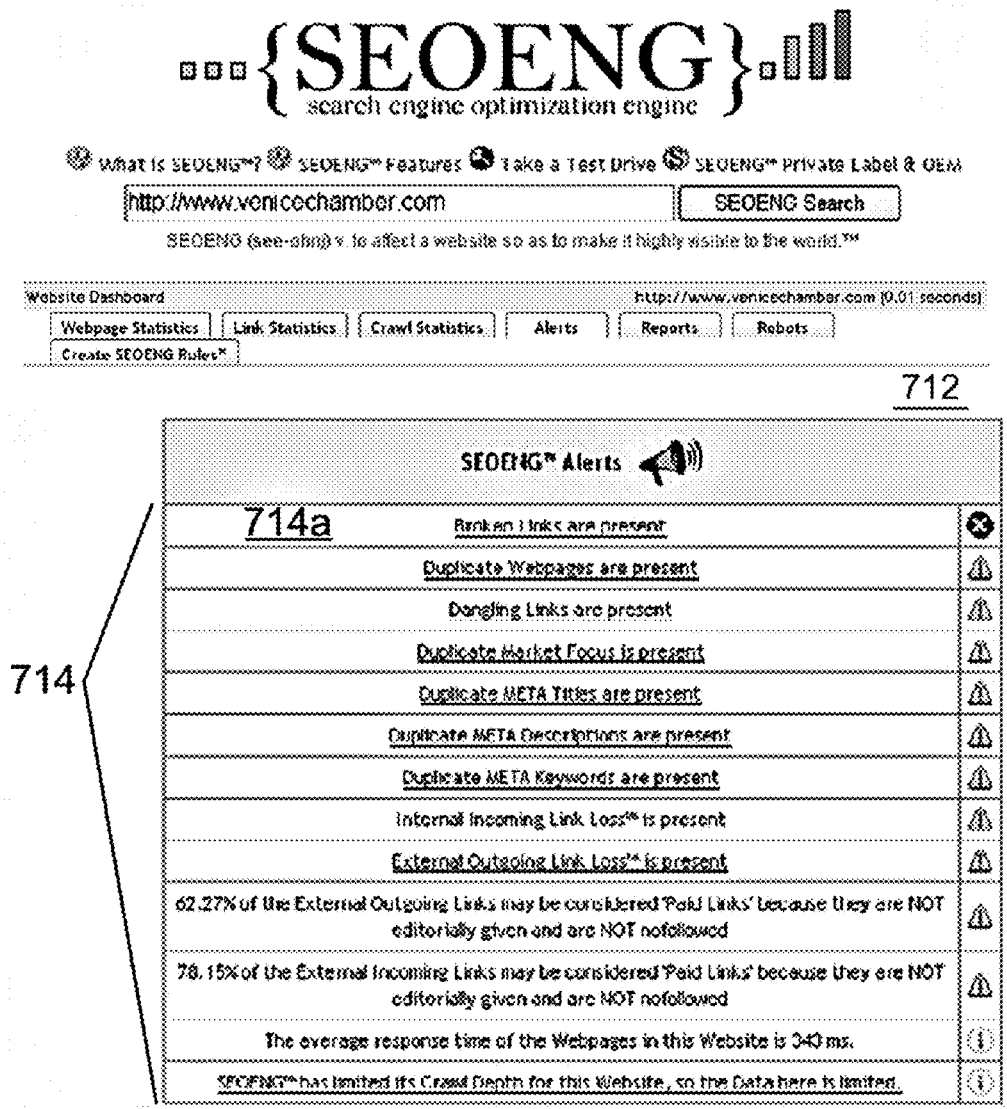
Figure 15:
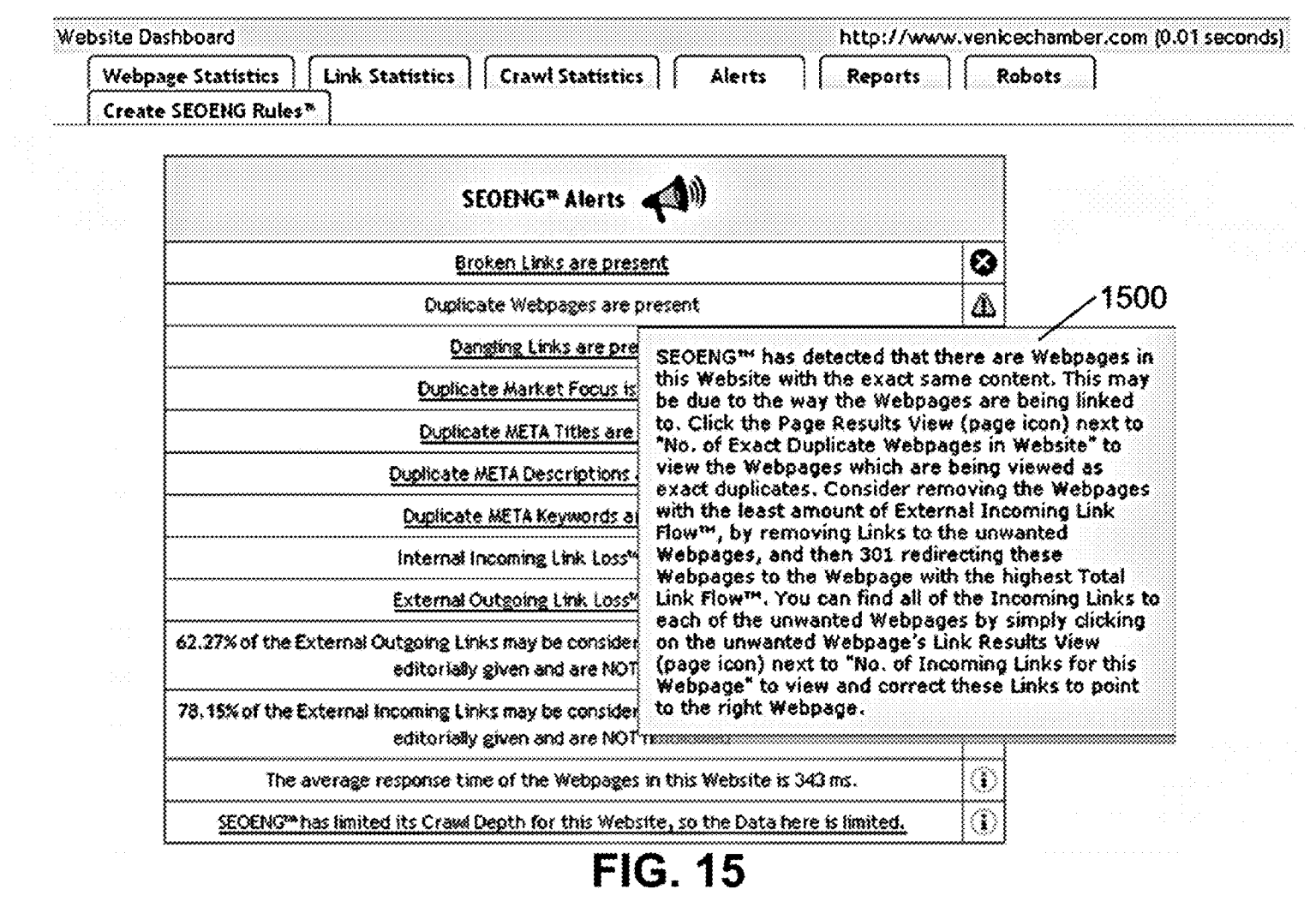

Referring to FIG. 7J, alerts page 712 may display all notifications that reflect negatively on the website's score or that a user has selected for display. For example, alerts 714 may include the presence of external outgoing LINK LOSS, duplicate content, duplicate META titles and the like. In one or more configurations, alerts page 712 may further display an average response time of webpages in the website. Referring to FIG. 15, hovering over an alert may provide a dialog box 1500 explaining the alert and suggesting corrective measures.

Figure 16:
FIG. 16 illustrates an example broken link listing according to one or more aspects described herein.

Clicking on an alert, on the other hand, may provide a listing of links or pages that are associated with the alert. For example, selecting broken links are present alert 714*a* in FIG. 7J may generate a link listing showing all links that are broken. FIG. 16 illustrates a broken link listing 1600.

Figure 7K:
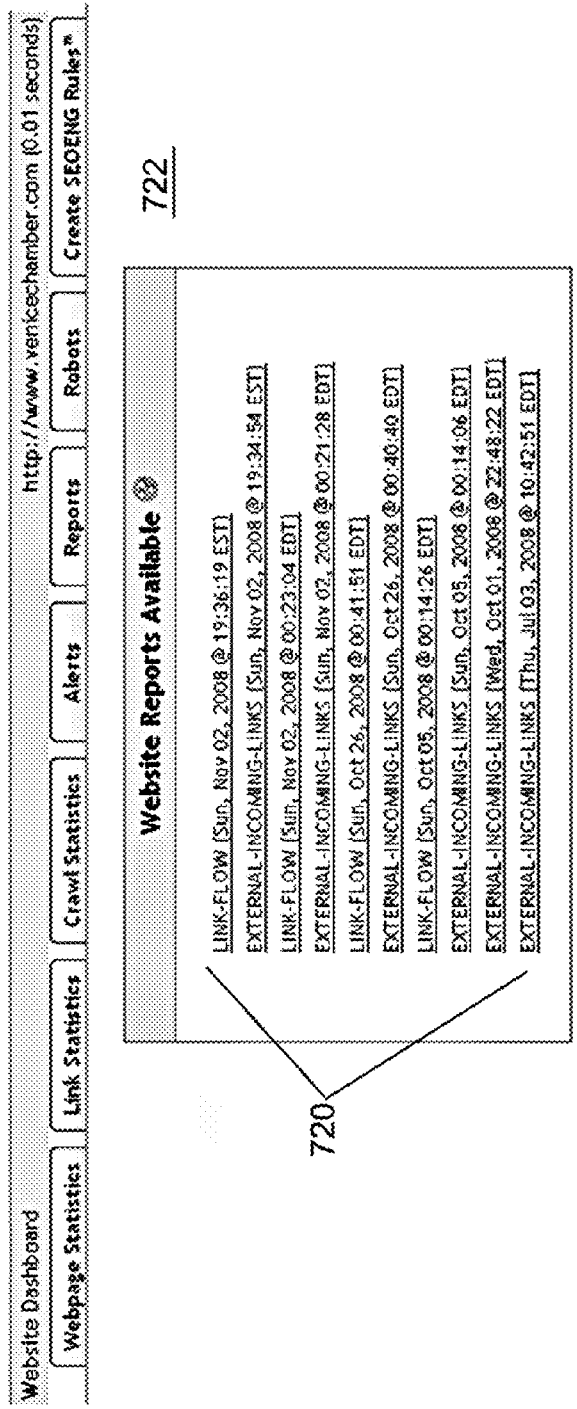

Referring to FIG. 7K, various website reports 720 may be provided in interface 722. Reports may include LINK FLOW analysis reports, an external incoming link (i.e., a backlink) analysis report showing the overall interaction of LINK FLOW coming to the website and the like.

Figure 7M:
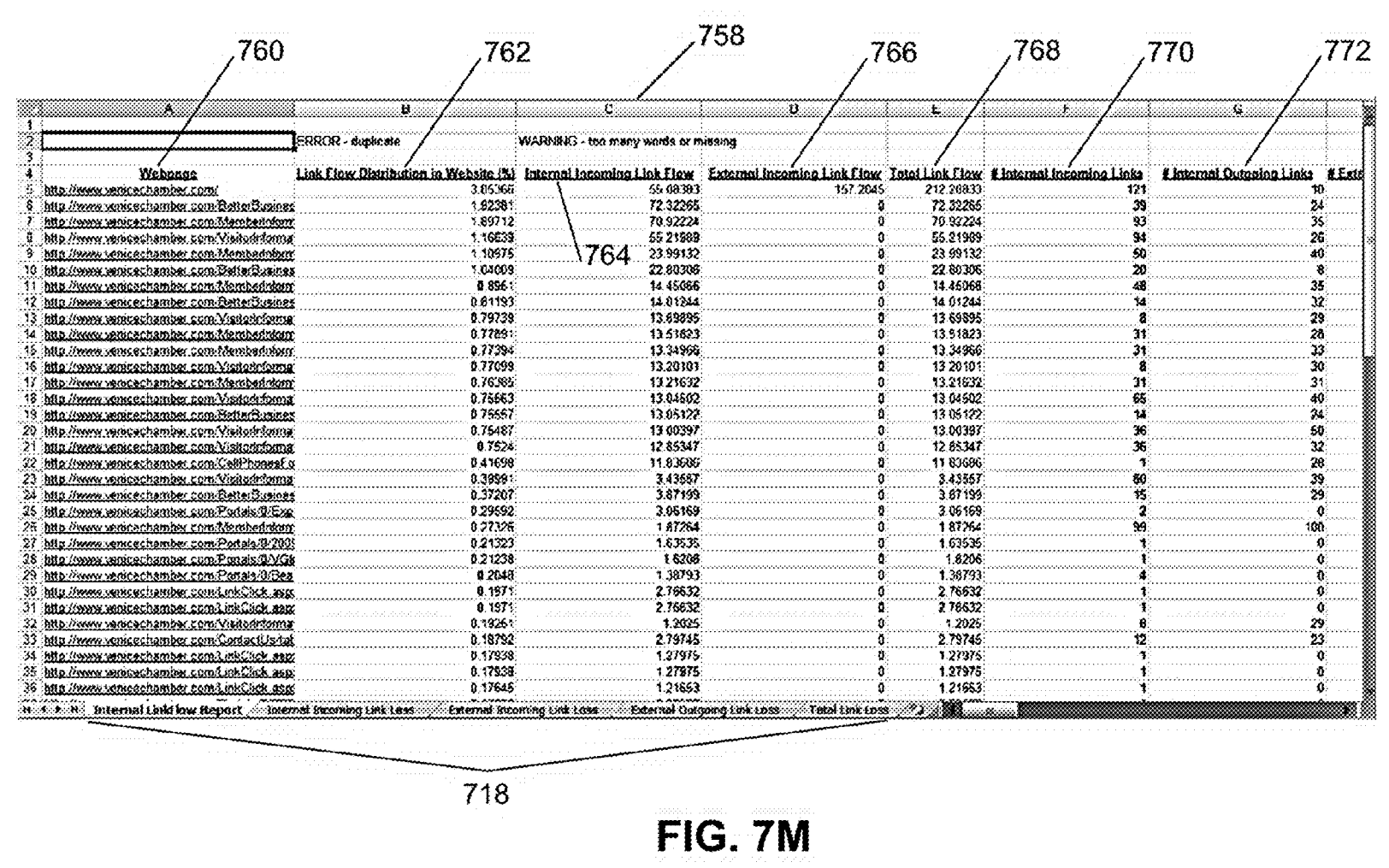
Figure 7N:
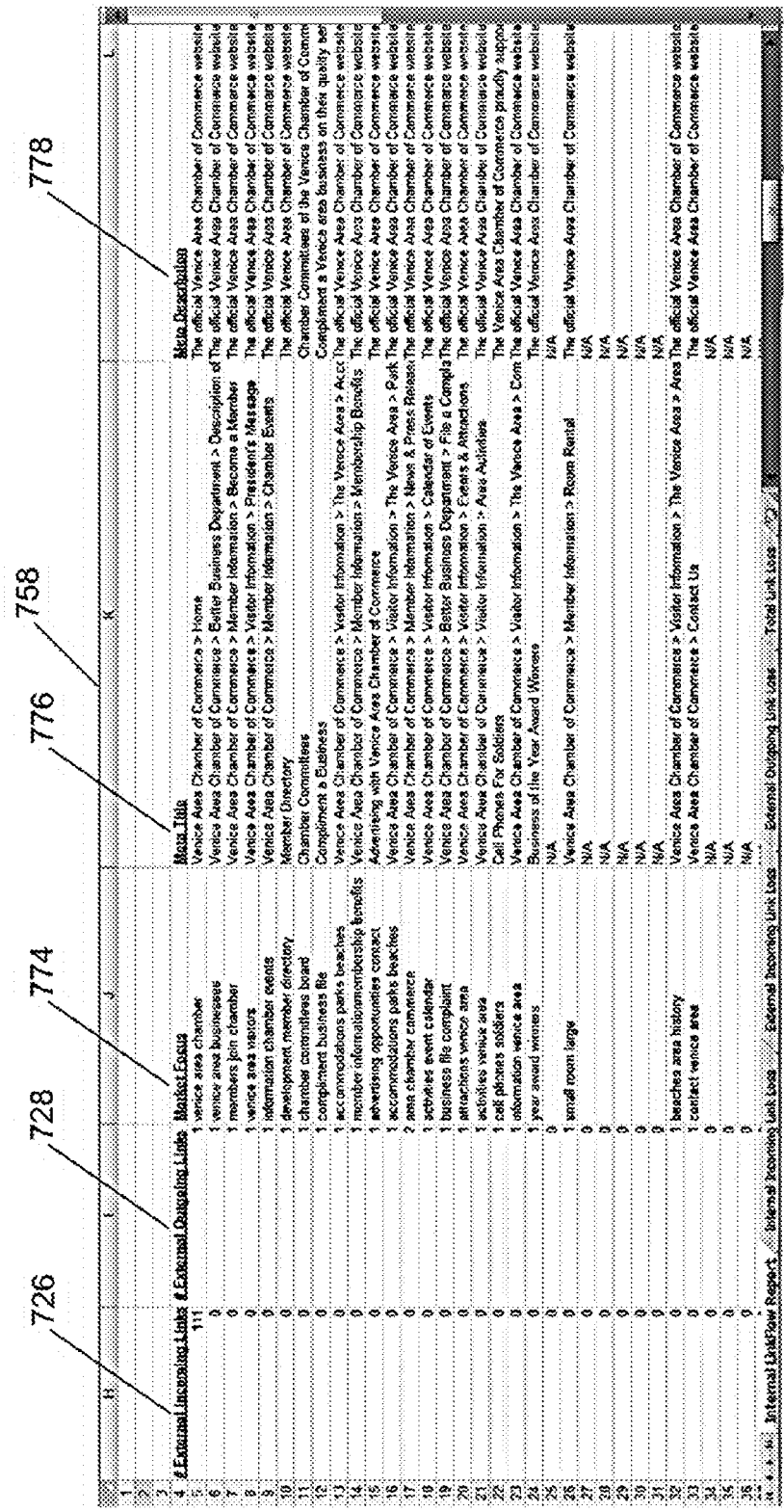
Figure 7O:
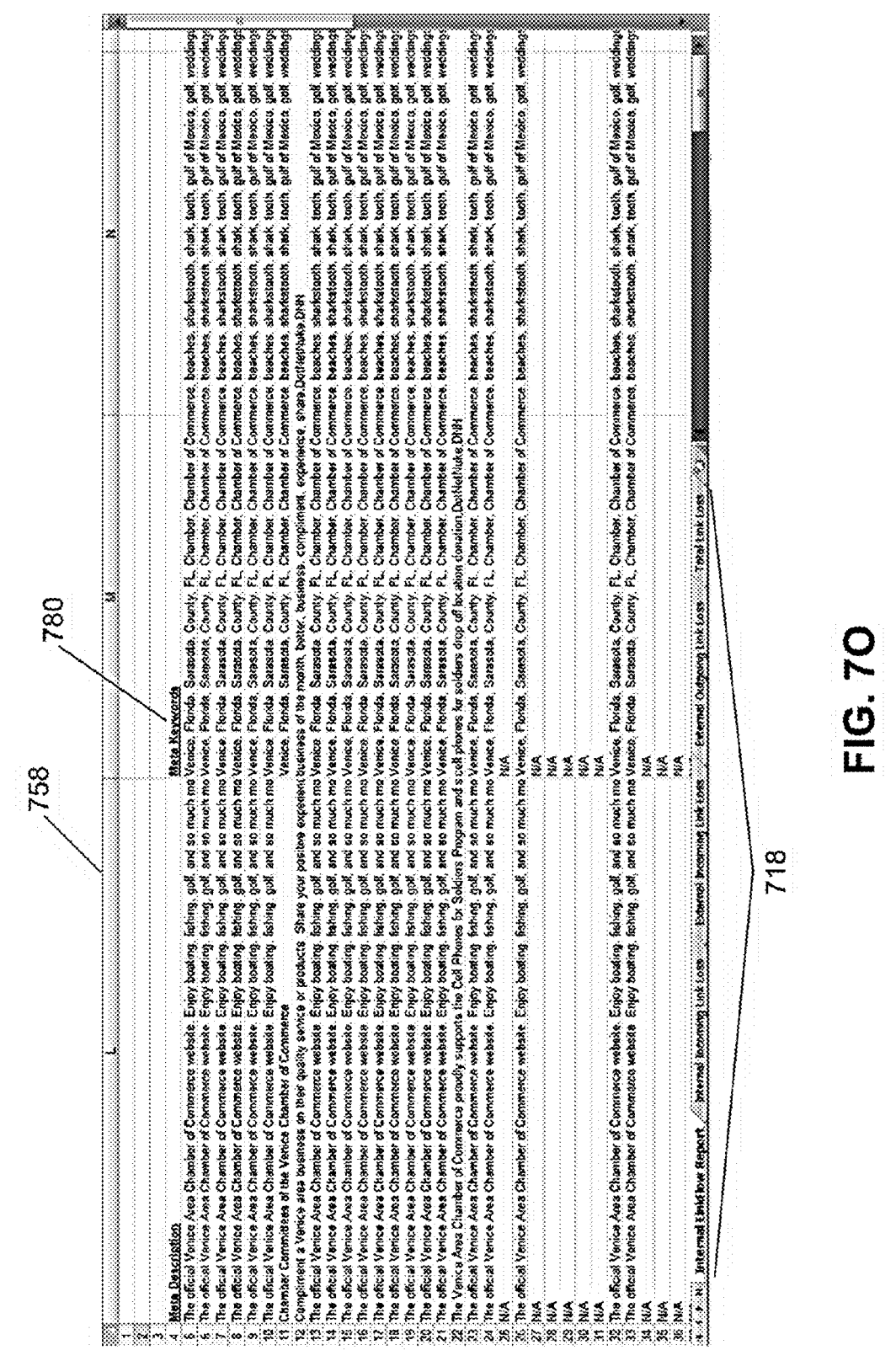

FIGS. 7M-O illustrate portions of a LINK FLOW report 758. FIG. 7M, for example, includes a listing of webpages 760 as well as a LINK FLOW distribution 762, internal incoming LINK FLOW 764, external incoming LINK FLOW 766, total LINK FLOW 768, number of internal incoming links 770 and total number of external incoming links 772 for each listed webpage. FIG. 7N illustrates a second portion of report 758. Report 758 may further include information such as a number of external incoming links 726, number of external outgoing links 728, market focus 774, META Title 776 and META Description 778 for each page. Still further, and as illustrated in FIG. 7O, report 758 may provide META Keywords information 780. The various data provided for each webpage may further be color coded (not shown) to denote various warnings or alerts. For example, if the MARKET FOCUS of a webpage is a duplicate of another webpage or if the META Title 776 is the same as another webpage, the entry may be highlighted or include some indicator (not shown) signifying such. The report may also contain additional tabs 718 showing other or additional report information relating to Internal Incoming Link Loss, External Incoming Link Loss, External Outgoing Link Loss, and Total Link Loss.

Figure 28:
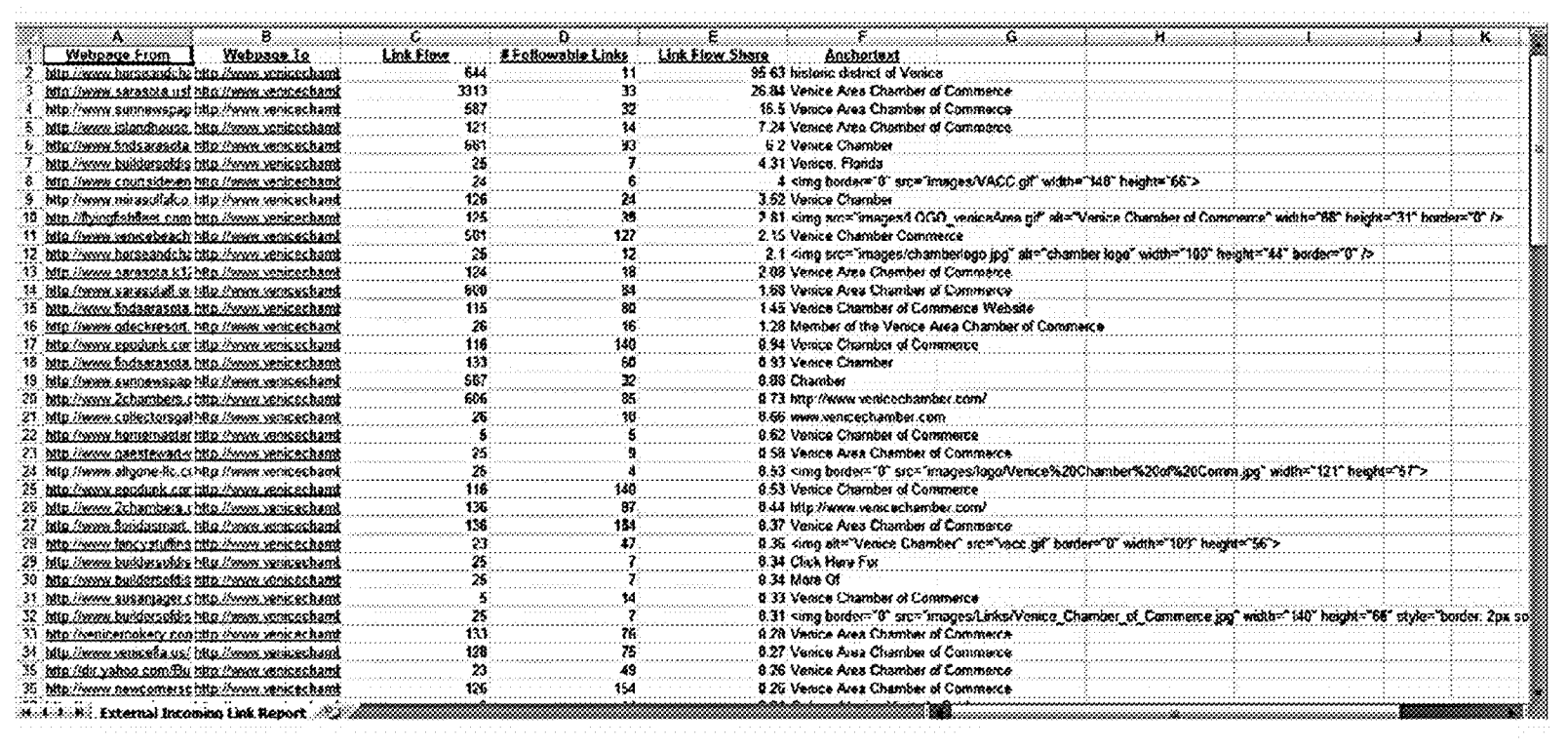

FIG. 28 illustrates another example report providing external incoming link information. External incoming link report may include data such as a webpage from which the link originates, a destination webpage, a LINK FLOW, a number of followable links, a LINK FLOW share and the anchor text associated with the link.

Referring to FIG. 7L, Robots section 715 displays any Robots.txt files that are included in the website. Robots.txt files are directives to automated computer programs used by search engines to crawl the Internet and store information about webpages. For example, directives may instruct a robot to not index a certain webpage.

Figure 7P:
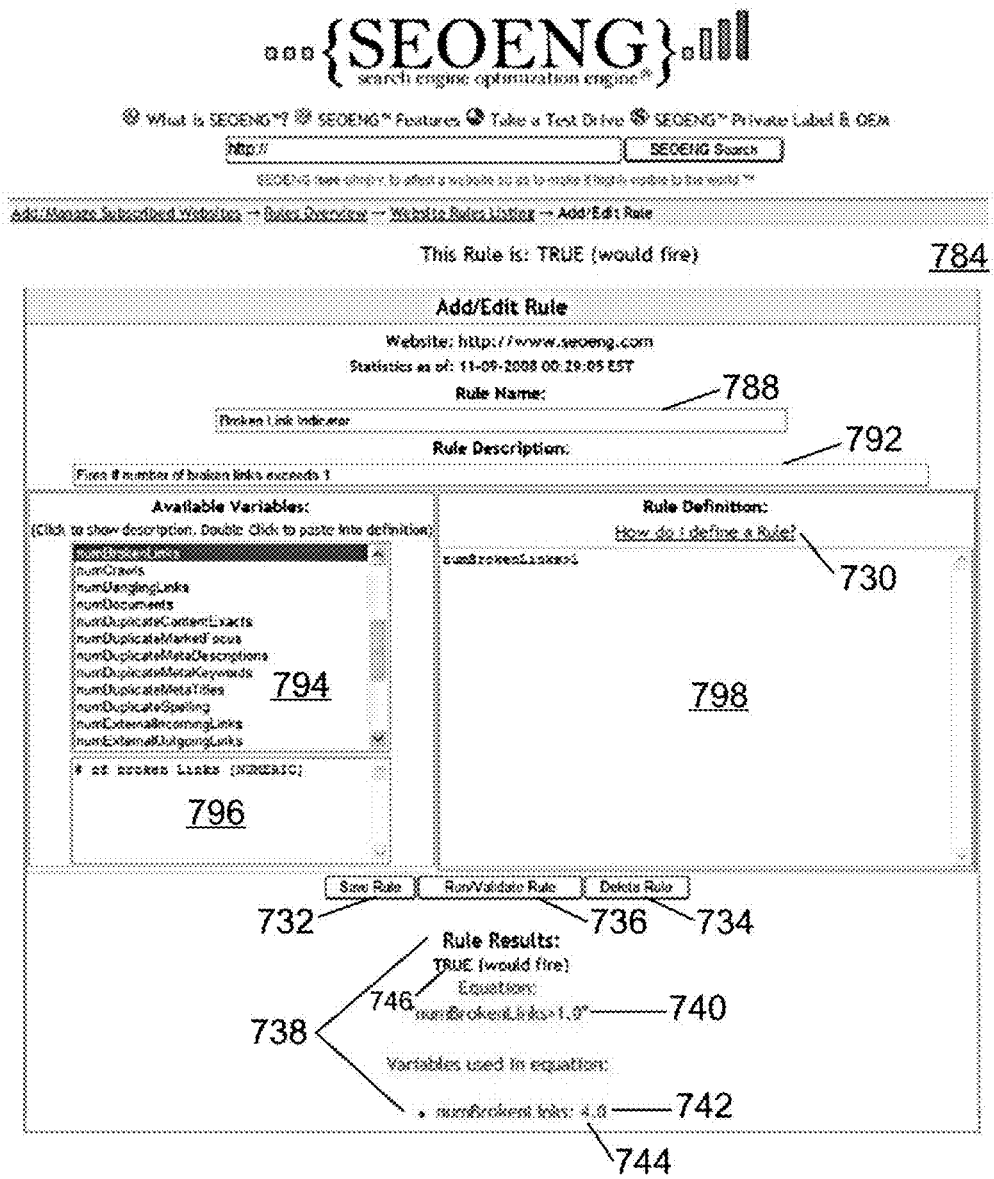

FIG. 7P illustrates a website-level rule creation interface 784 in which a user may specify conditions for which an event or action should be performed. Rule creation interface 784 includes a rule name entry field 788 for defining a name of the rule, rule description field 792 for describing the intent or purpose of the rule, available variables 794, variable description 796 and rule definition area 798. A tutorial option 730 may be provided to guide a user through how a rule is defined. Additionally, the user may save the rule 732, delete the rule 734 or run/validate the rules 736. Running or validating the rule using option 736 may allow a user to determine whether the rule is defined correctly, working and/or providing the intended result. Because the rule creation interface is configured at the website level, variables 794 may include website-level variables (in addition to webpage-level variables). Rules may further be executed or validated against all webpages, links and other attributes of the entire website. Results 738 may display the rule as defined 740, the variables used 742 as well the value 744 corresponding to the variables and a result 746.

Figure 11A:
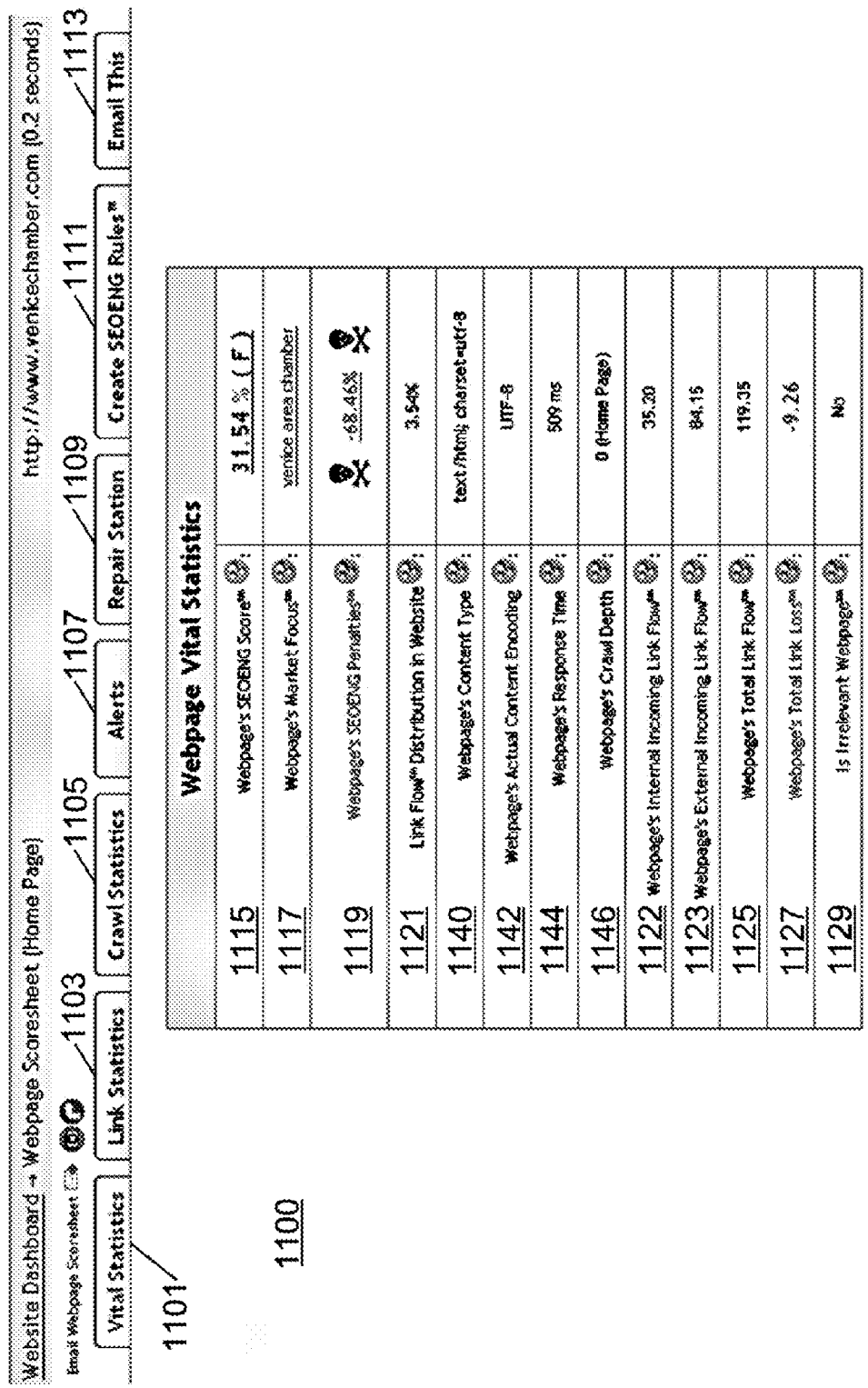
FIGS. 11A-11B illustrate portions of an example webpage scoresheet according to one or more aspects described herein.
Figure 11B:

FIGS. 11A-B illustrate various portions of a webpage scoresheet. Referring to FIG. 11A, webpage scoresheet 1100 may provide statistics and analyses for a webpage in the website such as the homepage. Scoresheet 1100 may include multiple information sections including vital statistics 1101, link statistics 1103, crawl statistics 1105, alerts 1107, repair station 1109, create rules 1111 and email option 1113. Create rules for webpage option 1111 as discussed herein allows a user to create a trigger for a specified condition such as a LINK FLOW score dipping below a certain threshold. Email option 1113 on the other hand, allows a user to email a webpage scoresheet or a link to the webpage scoresheet.

In vital statistics section 1101, scoresheet 1100 may provide information such as a webpage score 1115, a webpage MARKET FOCUS 1117, penalties 1119, LINK FLOW distribution 1121, internal and external incoming LINK FLOWS 1122 and 1123, respectively, total LINK FLOW 1125 and total LINK LOSS 1127. A relevance field 1129 may further indicate whether the webpage or network document is irrelevant. Scoresheet 1100 may further include information such as a content type 1140, encoding 1142 (i.e., how characters and/or text are encoded in the webpage), response time 1144 (i.e., how fast a webpage loads) and crawl depth 1146 (i.e., the minimum number of times a website visitor must click on a Link from the "root" webpage in order to get to a particular webpage).

Figure 12A:
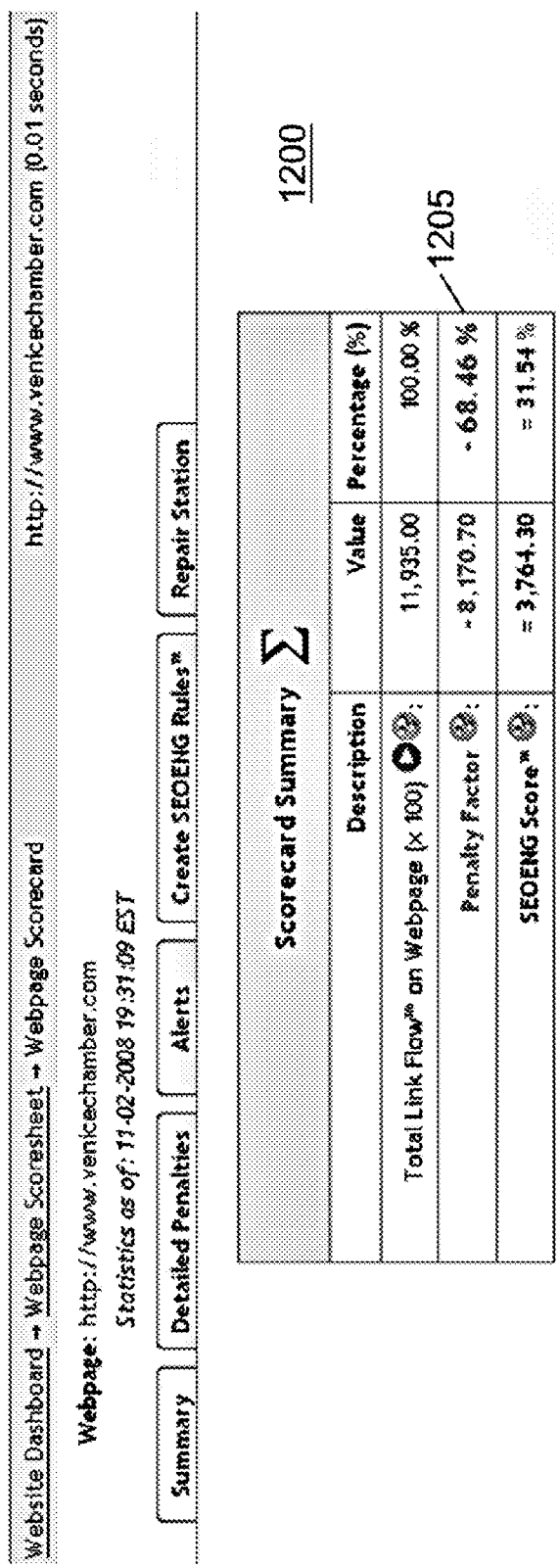

Webpage score 1115 may provide an overall score for the page that is selectable to display additional levels of detail regarding the score. FIG. 12A illustrates a webpage scorecard 1200 that provides a detailed view of how webpage score 1115 of FIG. 11A was derived or calculated. For example, scorecard summary 1205 explains that the webpage score was derived by adding together the total LINK FLOW of the webpage multiplied by 100 and the penalty factor (the penalty factor being negative). The percentages may be calculated based on a maximum score, penalty factor and total LINK FLOW.

Figure 11C:
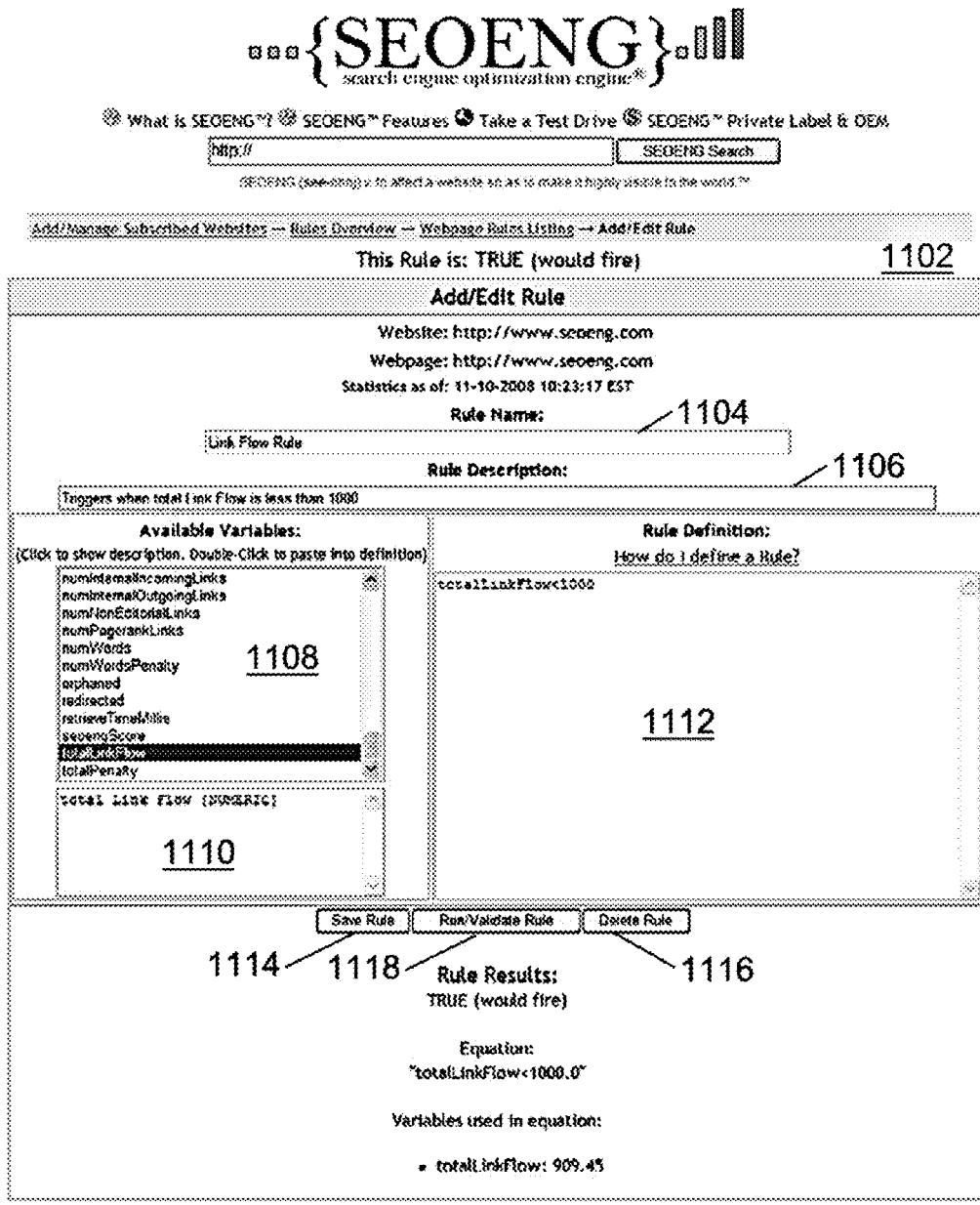

FIG. 11C illustrates a webpage-level rule creation interface 1102. Similar to the website-level rule creation interface 784 shown in FIG. 7P, webpage-level rule creation interface 1102 may include a rule name entry field 1104 for defining a name of the rule, rule description field 1106 for describing the intent or purpose of the rule, available variables 1108, variable description 1110 and rule definition area 1112. Additionally, the user may also save the rule 1114, delete the rule 1116 or run/validate the rules 1118. In contrast to a website-level rule creation interface, webpage-level rule creation interface 1102 might not include variables that are website specific or of website scope.

Figure 11D:
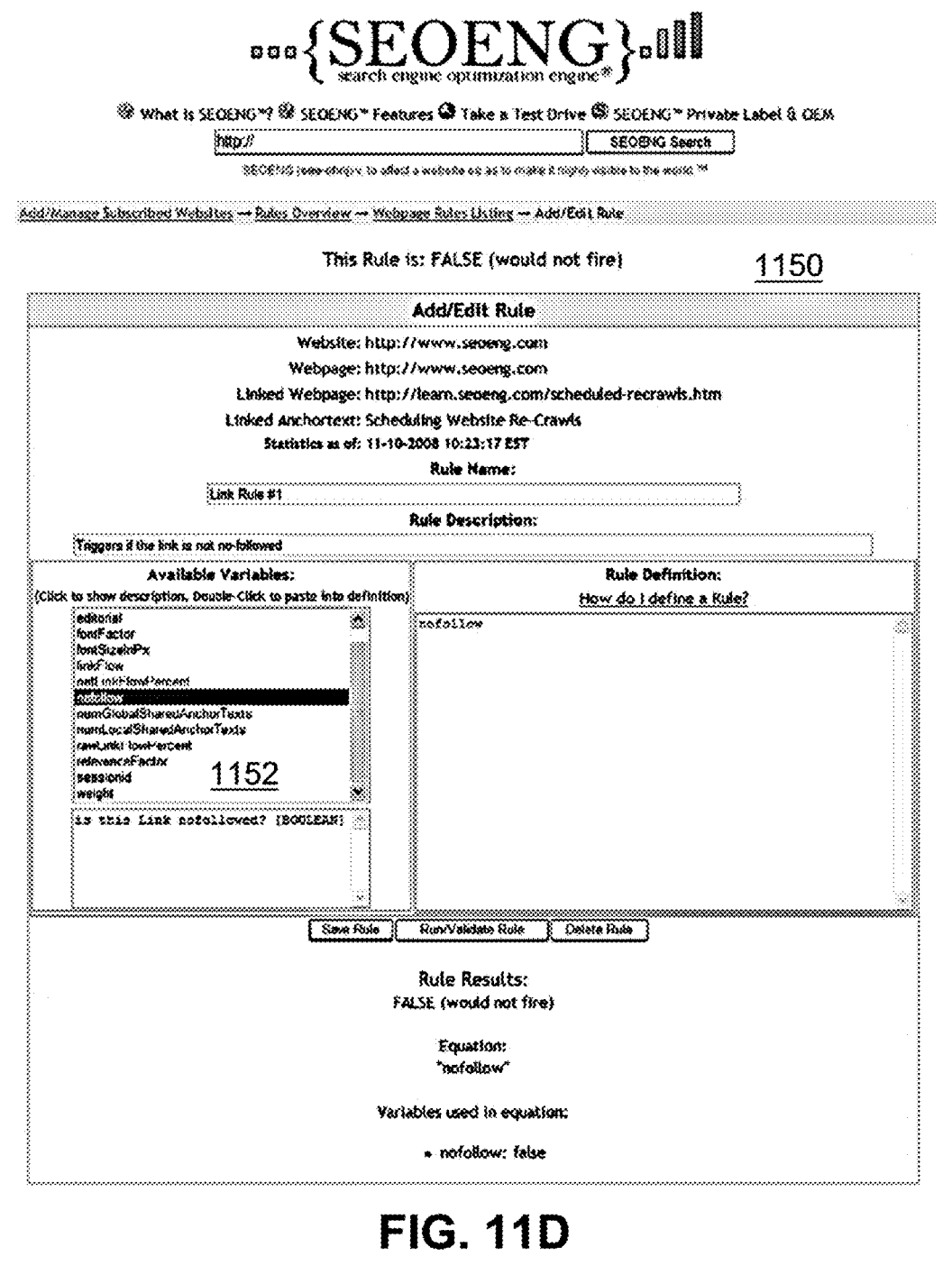

FIG. 11D illustrates a link rule creation interface 1150. Link rule creation interface 1150 may be similar to webpage rule creation interface 1102 (FIG. 11C) and website rule creation interface 784 (FIG. 7P). Instead of website level or webpage level variables, link rule variables 1152 might only include link level variables. Link rules may be defined for a single link or for multiple links as desired.

Figure 11E:
FIG. 11E illustrates an example interface for sending a scoresheet according to one or more aspects described herein.

FIG. 11E illustrates an interface 1160 for sending a webpage scoresheet. Interface 1160 may include an address field 1162 for identifying the address of an intended recipient. Once entered, the user may select send option 1164 to the addressee.

FIG. 12B illustrates a detailed listing of penalties and how they affect the overall webpage score. For example, the number of unique words on the webpage 1207 affected the overall webpage score by −22.87% while the percentage of "incoming paid links" 1209 affected the overall webpage score by −3.85%.

Figure 12C:
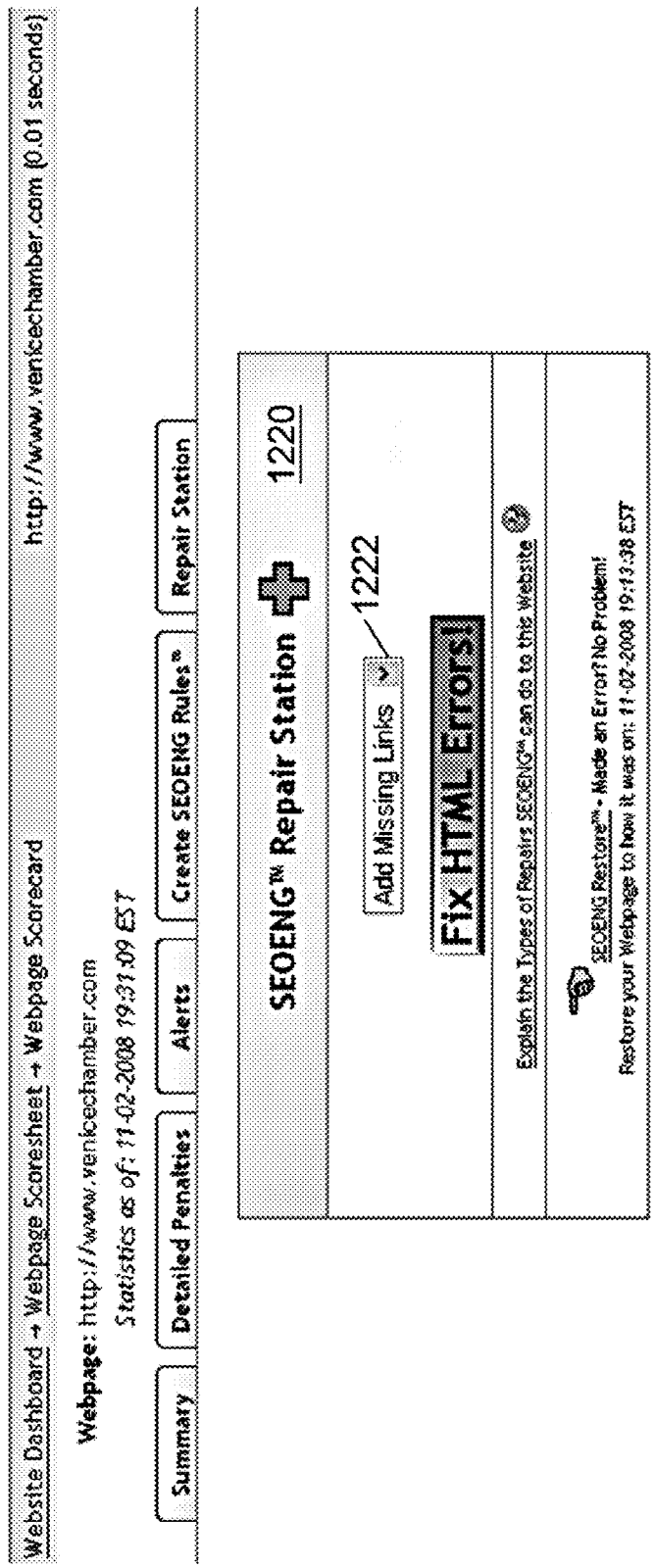
Figure 12D:

FIG. 12C illustrates a repair station 1220 that aids a user in repairing various errors or issues with the webpage. For example, upon selecting Add Missing Links for drop down menu 1222, replacement page code may be automatically generated. FIG. 12D illustrates a display of replacement page code 1224 that a user may copy and paste to correct the missing links error.

Figure 13A:

Referring again to FIG. 11A, selecting the MARKET FOCUS text 1117, for example, may display a MARKET FOCUS RANK of the various MARKET FOCUS words or phrases that were considered. FIG. 13A illustrates a MARKET FOCUS details page 1300 that includes a listing of MARKET FOCUS words, contexts and phrases 1305 considered and their ranks 1310. The MARKET FOCUS rank may be calculated using a shingle analysis which includes considerations of webpage content, META title, META descriptions and incoming anchor text. FIGS. 13B and 13C illustrate the incoming anchortext analysis and the shingle analysis, respectively. For example, FIG. 13C illustrates the phrases considered 1330 and the number of occurrences 1335 in the website or webpage. In FIG. 13B, on the other hand, anchor text (i.e., text used in a link) is measured for LINK FLOW and ranked in accordance with the determined LINK FLOW.

Referring now to FIG. 11B, link statistics section 1103 provides link analysis information similar to that of link statistics section 707 of FIG. 7A. However, FIG. 11B shows link statistic information for the particular webpage and FIG. 7A shows link statistic information for the entire website. In particular, link statistics section 1103 displays outgoing link information 1131, incoming link information 1133, link quality data 1135, link neighborhood information 1137 and LINK LOSS analysis 1139. In addition to providing an option 1145 to view a listing of links contributing to each of the factors analyzed (e.g., factors 1143), an option 1141 to view the link in the webpage is also provided.

As noted above, the optimization engine may provide a listing of links that contribute to one or more factors used in determining the website or webpage score. Referring again to FIG. 9, each of link entries 901 may include a view link option 903 and a link scorecard option 905. Upon selecting link scorecard option 905, a scorecard may be displayed detailing how the link was scored.

Figure 14A:

FIGS. 14A-D illustrate various portions of an example link scorecard. Referring to FIG. 14A, link scorecard 1400 may display a scorecard summary 1401 that provides a description of the factors used in determining an overall LINK FLOW share score 1403. For example, the overall LINK FLOW share score 1403 may be determined based on the total LINK FLOW on the webpage, a number sharing LINK FLOW, a gross LINK FLOW share (i.e., the amount of LINK FLOW passed from one webpage to another through a particular page), a penalty score, a percentage of LINK FLOW share remaining after penalties and gained LINK FLOW from other links' penalties. Scorecard 1400 may include a general information section above the section tabs that provides information about the webpage on which the link exists and the webpage to which the link is directed. A view link option 1405 and an indication of when the statistics were generated 1407 may also be provided.

FIG. 14B illustrates an additional level of detail relating to the link's penalties. Penalties section 1410, for example, provides a breakdown of how the penalty score is determined. Various penalty factors include the link's order on the webpage, anchor text font size, whether the link is non-editorial, relevance of the link, number of duplicate anchor text on and to webpage and a percentage LINK FLOW share to be considered.

Figure 14C:
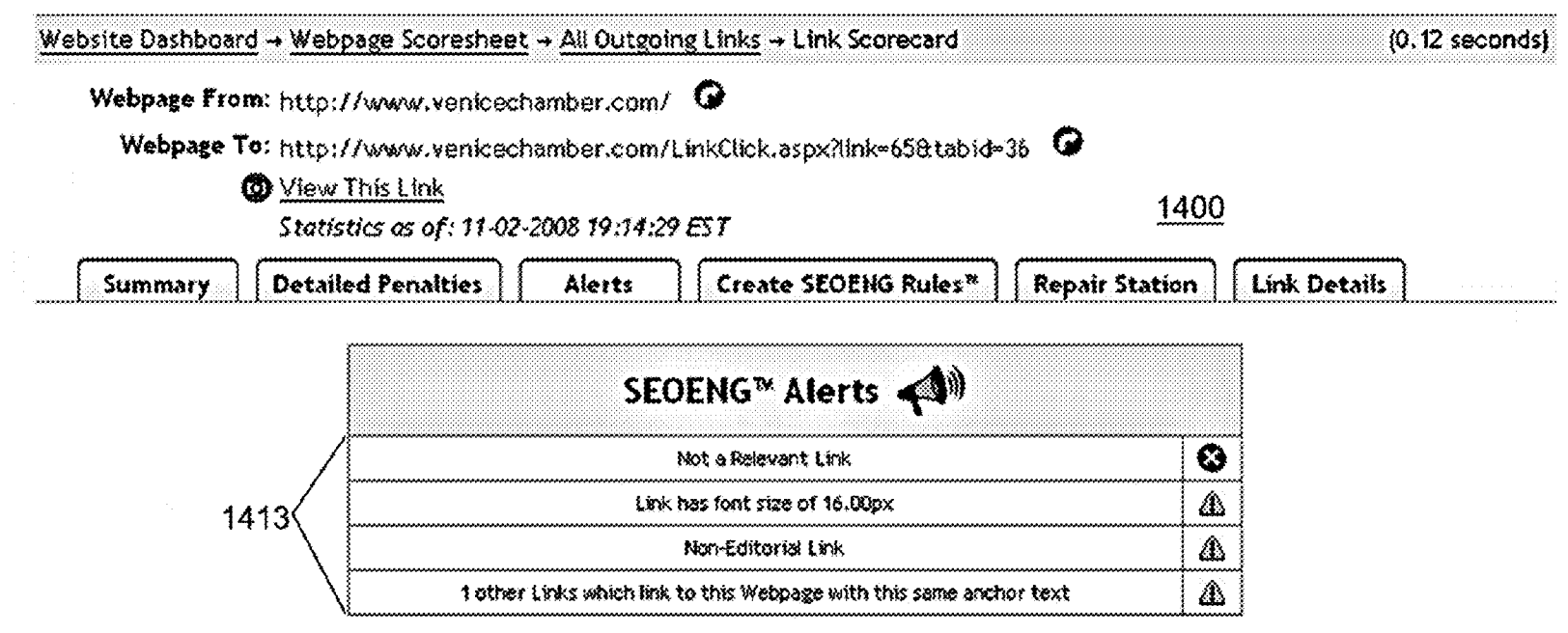

FIG. 14C illustrates an alert section of the link scorecard 1400. In particular, the alerts may include whether the link is relevant, the font size of the link, whether the link is editorial or not and whether the link has the same anchor text as another link on the website. As noted previously, selecting or hovering over one of alerts 1413 may provide a suggestion on how to eliminate the alert.

FIG. 14D illustrates a link details section of scorecard 1400. Link details section 1420 provides a listing 1425 of the various link characteristics including net LINK FLOW share, anchor text, font size, whether the link has a session ID, whether the link is tagged with nofollow and whether the link is broken, dangling, reciprocal, or editorial.

Other factors that may be considered in determining a ranking of a webpage, a website or a link may include reverse redirect information (i.e., which webpages are being redirected to a webpage), forward redirect information (i.e., which webpages are being redirected to from a given webpage, total or alternative search volume by MARKET FOCUS (i.e., how many people on the Internet or the network are searching for a given webpage or website), age of website, statistical deviation analysis of external incoming anchor text (i.e., analysis of differences in text being used to link to a particular webpage/website), purchased or relevant link detection (i.e., links being used to subvert a search engine's algorithms), and/or unnatural keyword stuffing (i.e., use of keywords or phrases to subvert a search engine's algorithms).

Figure 17:
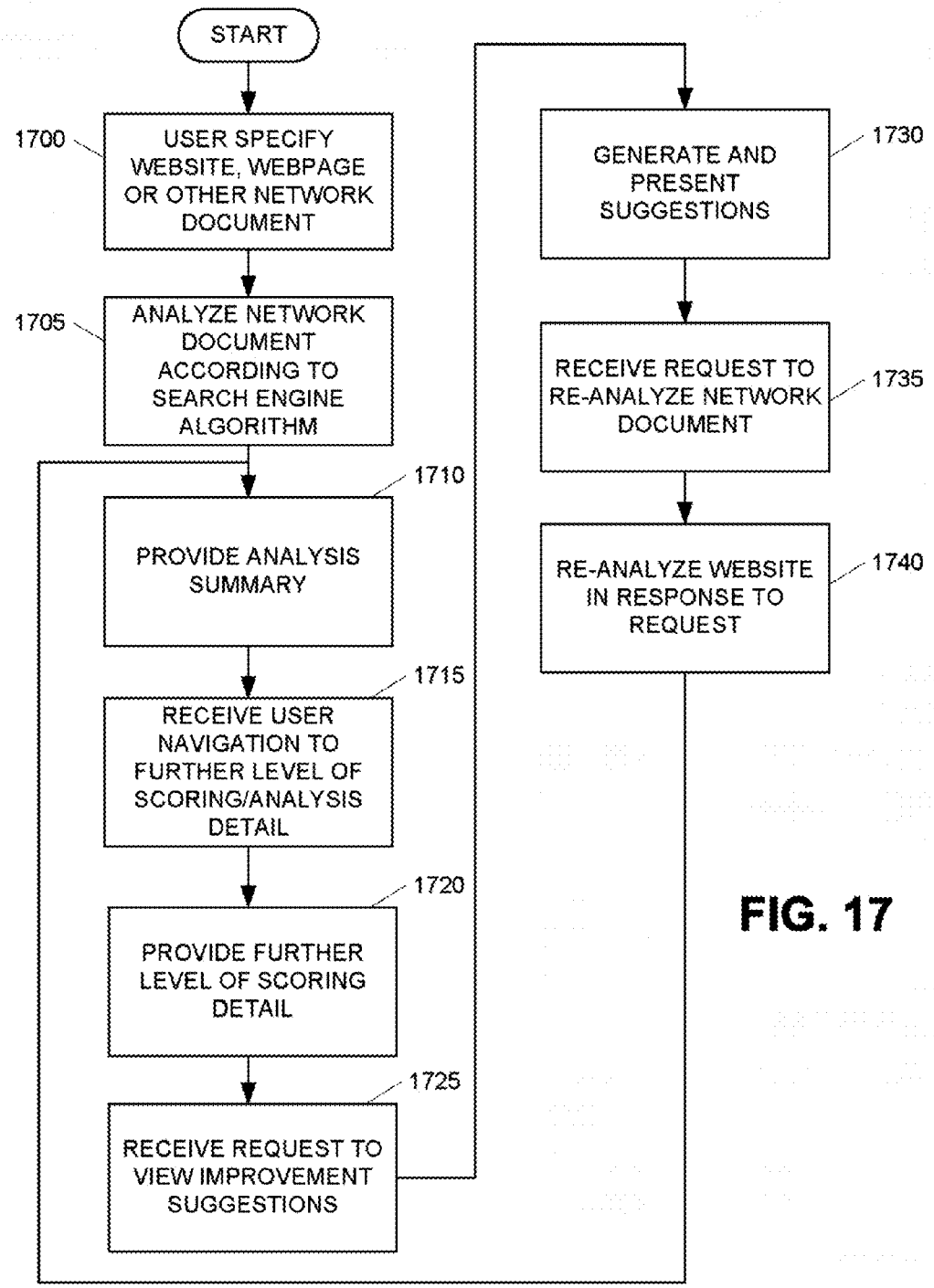
FIG. 17 illustrates an example method for analyzing a webpage and navigating the analysis according to one or more aspects described herein.

FIG. 17 illustrates an example method by which a user may request a search engine optimization analysis of a website or webpage and retrieve and view details of the analysis. In step 1700, a user may specify a website, webpage or network document address. The address may comprise a uniform resource identifier such as a URL. In step 1705, the optimization engine may analyze the website according to various search engine algorithms to derive a website score. This may occur before or after the user requests in step 1700. The analysis may include some or all of the factors described herein such as LINK FLOW, duplicate information, missing tags, word length and the like. Once the analysis is complete, a summary may be displayed in step 1710. In one or more configurations, the analysis may already have been pre-compiled and available upon receiving the request. Thus, the optimization engine might not need to perform an analysis upon receiving the request; instead, results from the previous analysis may be retrieved. The summary may contain a first level of scoring detail such as information similar to that displayed in dashboard 700 of FIG. 7A. In particular, the summary may include information considered by the search engine during the analysis. This provides transparency into the search engine process and allows a user to optimize his or her website, webpages, or links based on the actual analysis used by the search engine.

From the scoring or analysis summary, the user may subsequently navigate to a second level of scoring detail in step 1715. For example, the user may select a penalties section to view the factors that negatively affected the website's score. In another example, the second level of scoring detail may include a breakdown of the overall website score or a subscore contributing to the overall score. In step 1720, the second level of scoring detail may be displayed to the user. As with the first level of detail, the second level of scoring detail may provide factors and scoring used and generated by the scoring engine in determining the website, webpage, and link's overall score or rank.

In step 1725, the optimization engine may receive a request to view suggestions for improvement. In step 1730, the optimization engine may generate and present the suggestions to the user. The optimization engine may generate such suggestions based on the factors negatively impacting the website's score. For example, if the website has broken links, the optimization engine may suggest that the broken links be fixed to raise the website's score. In step 1735, the optimization engine may receive a request to re-analyze the website and update the score. Such a request may be received, for example, once a user has updated his website with certain fixes or made improvements based on the generated suggestions. In step 1740, the optimization engine may instruct or request a search engine to re-analyze the website in response to the request (i.e., on-demand). The optimization engine may further re-analyze and re-display the search engine data to the user. Re-analysis may include a re-crawling of the website and corresponding webpages, network documents, and websites. A new scoring summary may then be displayed to the user as in step 1710. Alternatively, the re-analysis of the website may be queued for a later time (e.g., a time when the website is scheduled to be re-crawled).

Figure 18:
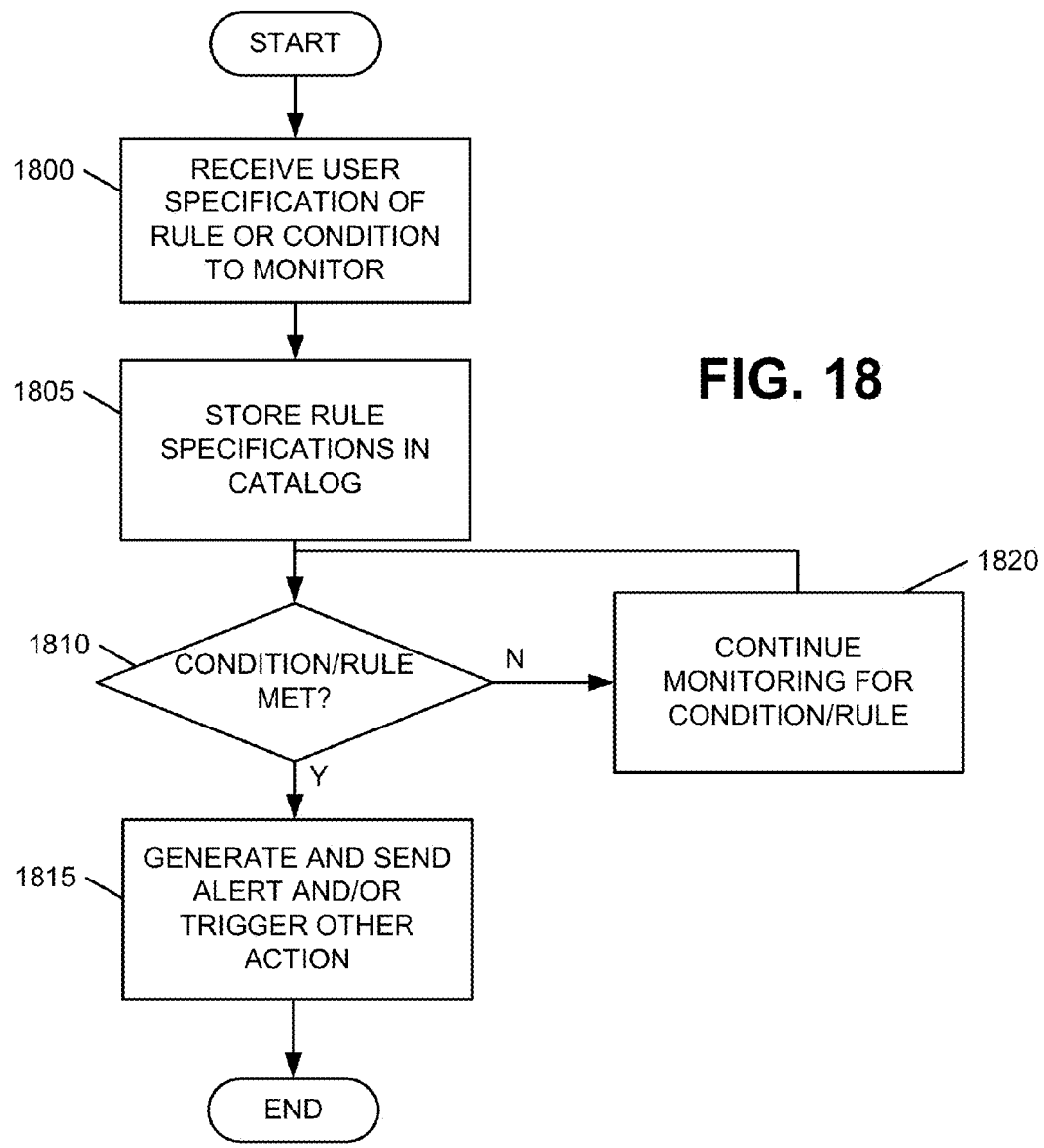
FIG. 18 illustrates an example method for creating and generating alerts according to one or more aspects described herein.

FIG. 18 illustrates an example method for creating and receiving alerts through an optimization engine or tool. In step 1800, the optimization engine may receive a user specification of a rule or condition that they wish to monitor for in the website, webpage, or link. The rule or condition may include a number of broken links, a LINK FLOW score, amount of duplicate content and the like. In step 1805, the optimization engine may store the rule specifications in a catalog configured to store rules that are applied by the optimization engine. In step 1815, the optimization engine may determine the rule or condition has been met or satisfied. If so, the optimization engine may generate and send an alert to the user in step 1820. If not, the engine may continue monitoring for the condition or rule in step 1825. The rule may, additionally or alternatively, trigger an external action such as a process outside of the search engine or re-crawling. In one example, the search engine may send an alert along with suggestions for eliminating or improving the condition met.

Figure 19:
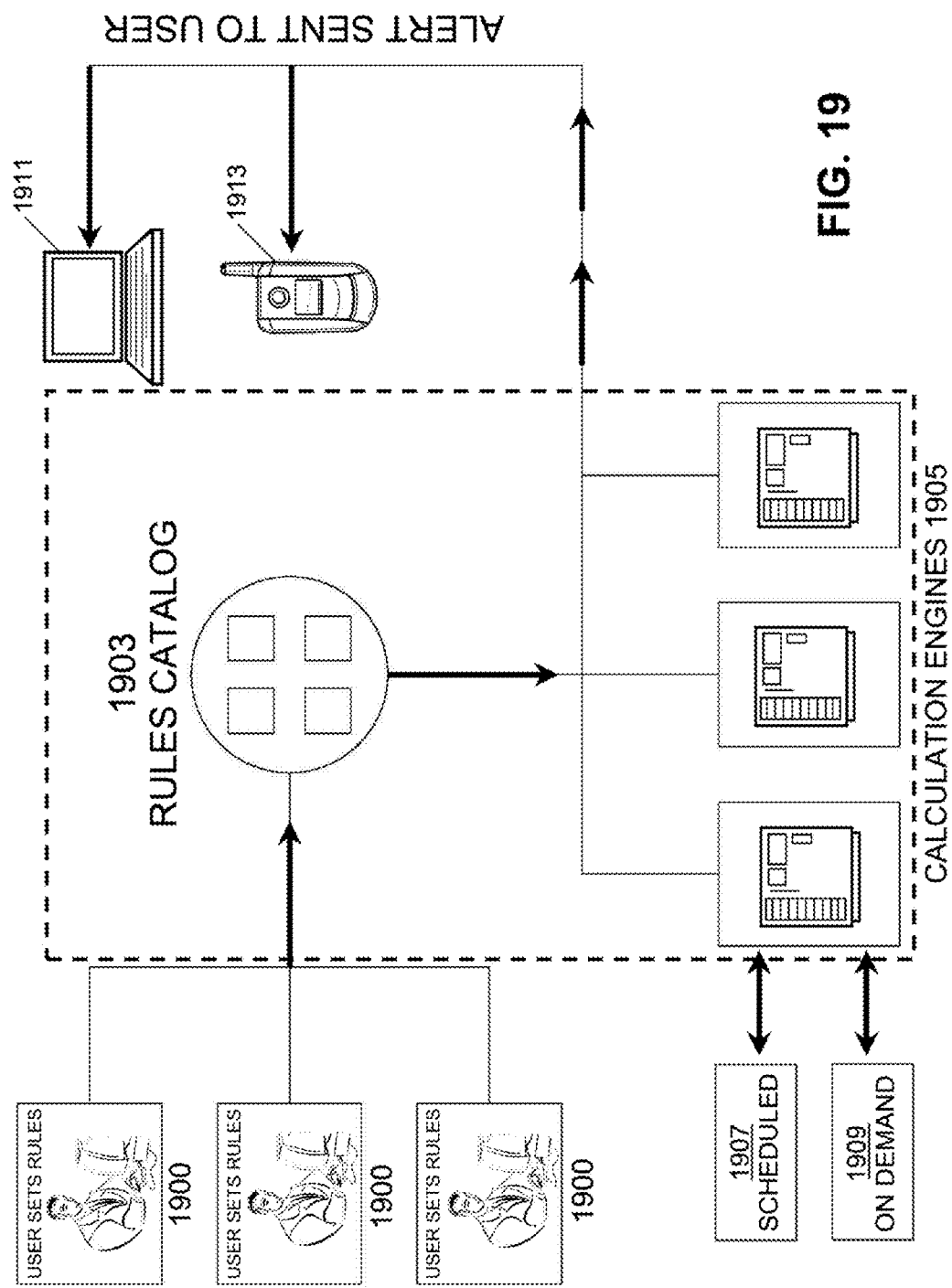
FIG. 19 illustrates a block diagram of an example alert system according to aspects described herein.

FIG. 19 illustrates a block diagram of an alert system. Inputted alerts 1900 may be sent to catalog 1903, which maintains rules that are applied by the calculation engines 1905. The calculation engines 1905 may be configured to organize and analyze data either by schedule 1907 or by on-demand requests 1909. During the course of organizing and/or analyzing data, an alert triggered may be triggered by one or more of alerts 1900. When such an event occurs, the calculation engines 1905 may send an alert to client devices 1911 and/or 1913. Alerts catalog 1903 and calculation engines 1905 may be part of a single system or may be separate from one another. For example, alerts catalog 1903 and calculation engines 1905 may be part of a distributed optimization engine.

According to one or more aspects, an optimization engine may provide a user with LINK FLOW distribution information. LINK FLOW distribution refers to the set of transition probabilities or adjacency functions of a random surfer as determined using node ranking. Further details regarding a method for node ranking in a linked database may be found in U.S. Pat. No. 6,285,999. Node ranking refers to a numerical weighting to each element (e.g., a webpage) of a hyperlinked set (e.g., a website of webpages) of documents, such as the World Wide Web (WWW), with the purpose of "measuring" its relative importance within the set.

Figure 20:
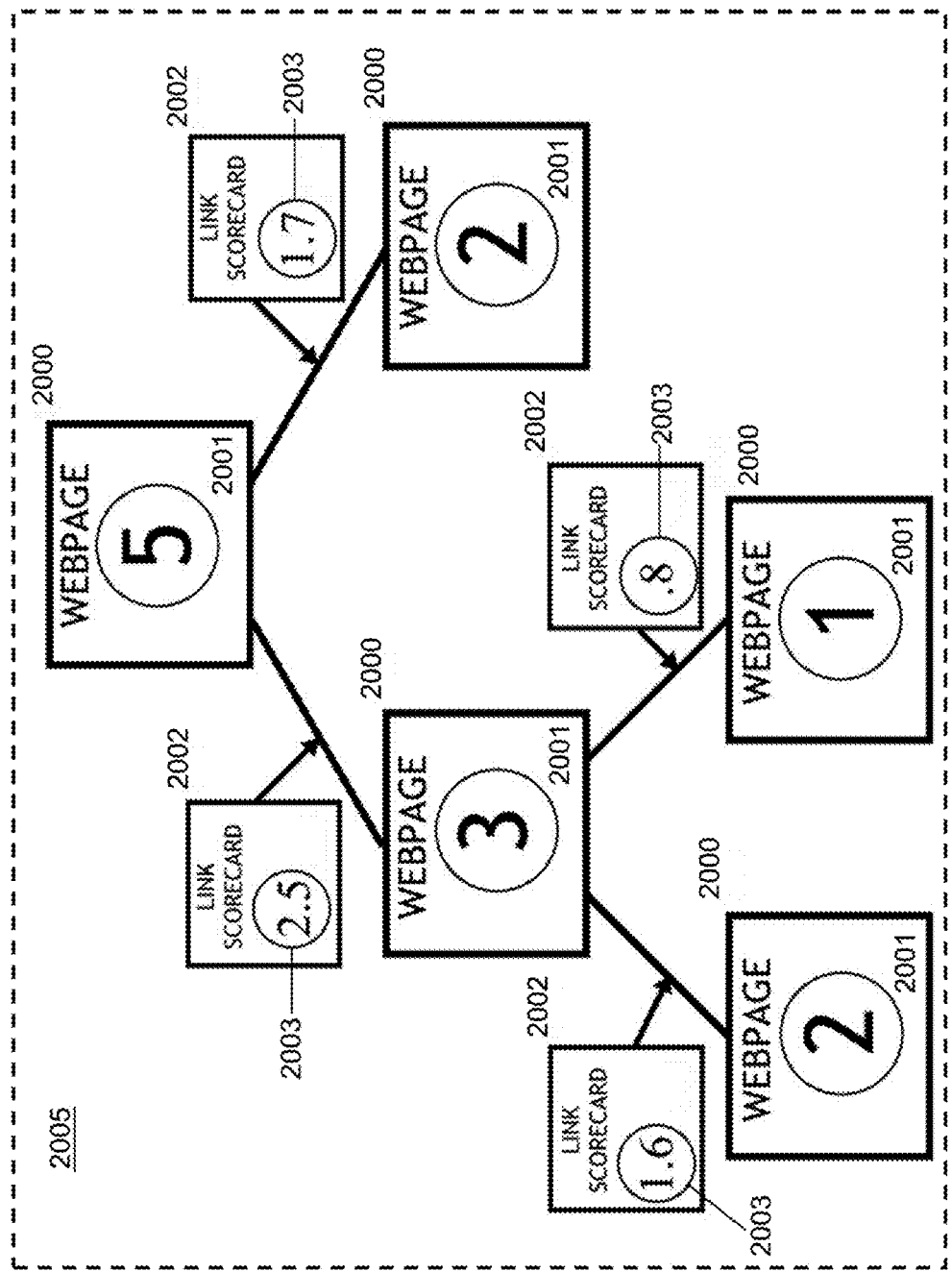
FIG. 20 illustrates a link flow distribution according to one or more aspects described herein.

FIG. 20 illustrates a diagram depicting LINK FLOW distribution within a website 2005. Each of webpages 2000 is shown as having a specific node rank 2001.

The node rank values 2001 are the entries of the dominant eigenvector of the modified adjacency matrix. The node ranking is represented as the dominant eigenvector in the set PR($p_n$). The eigenvector may be expressed as:

$$R = \begin{bmatrix} PR(p_1) \\ PR(p_2) \\ \vdots \\ PR(p_N) \end{bmatrix}$$

where R is the solution of the equation $$R = \begin{bmatrix} (1-d)/N \\ (1-d)/N \\ \vdots \\ (1-d)/N \end{bmatrix} + d \begin{bmatrix} \ell(p_1, p_1) & \ell(p_1, p_2) & \cdots & \ell(p_1, p_N) \\ \ell(p_2, p_1) & \ddots & & \vdots \\ \vdots & & \ell(p_i, p_j) & \\ \ell(p_N, p_1) & \cdots & & \ell(p_N, p_N) \end{bmatrix} R$$

where the adjacency function l($p_i,p_j$) is 0 if page $p_j$ does not link to $p_i$, and normalized such that, for each j $$\sum_{i=1}^{N} \ell(p_i, p_j) = 1,$$

That is, the elements of each column sum up to 1. The dominant eigenvectors are shown as a result of this calculation, embodied as node ranks 2001, and assigned to each of webpages 2000 in the graph of webpages. By visiting each of webpages 2000, a user can see the "importance" of a webpage in relation to the rest of the webpages 2000 in that graph.

By displaying the scoring mechanism of each link's weighting of this probability, the optimization engine may display the entire process of the algorithm for node ranking in a linked database, rather than simply the final dominant eigenvectors (i.e., node rankings 2001) which are assigned to each webpage or network document. Providing users with this detailed information may be important to assist them in distributing, funneling, and controlling the final dominant eigenvectors (i.e., node ranking) within their website (i.e., website 2005). Without this knowledge, the method for node ranking webpages in a linked database is essentially a "black box." That is, while users may know the node ranking of a webpage or network document, they do not know the LINK FLOW Distribution, or the set of transition probabilities or adjacency functions (e.g., l($p_i,p_j$)) that determine those final eigenvectors. Typically, website owners simply make changes, and wait for the search engine to recalculate the node ranking algorithm and to display the revised results (which can take up to a month or more for a typical search engine to re-crawl the website). By showing them the LINK FLOW Distribution, and by allowing users to request immediate re-crawls of a website, each adjacency function can be modified to tweak the final eigenvectors by a precise amount. An optimization engine may further provide individual link scorecards 2002 for each link within website 2005. Link scorecards 2002 each provide a score 2003 for the corresponding link.

Using the optimization engine, a user may visually navigate through the path taken by a search engine when analyzing a website and crawling through the network of websites or webpages during the analysis. As illustrated above, a user may begin by requesting the analysis of a website. In order to determine how the website was analyzed and scored, the user may navigate through the analysis, essentially following the path taken by the search engine to produce the score. Referring again to FIG. 6, a user may begin by viewing the website dashboard 600 displaying an overview of the website for which analysis was requested. The user may then navigate to each of the webpages in the website contributing to the website's score through webpage listings 605 and view a corresponding scoresheet, e.g., scoresheet 603. Scores may be determined based on the same metric and thus, an analysis and score for a first page, website or link may be compared with a second page, website or link, respectively, using the scores. In one arrangement, an optimization engine may provide a comparison of an analysis of the first page with an analysis of the second page (e.g., a side by side comparison). A user may drill down to a further level of detail by reviewing factors contributing to each webpage's score (e.g., by viewing scorecard 615). The user may further follow links that are analyzed by the search engine when scoring the website or webpage. Using these links, the user may navigate the path taken by the search engine when crawling for data and performing the website analysis. For example, from scoresheet 603, a user may view link listings 607b that were analyzed by the search engine. The user may then navigate to link scorecards 619 or proceed to a webpage scoresheet 623 of a linked page using the link. Thus, the user is navigating through the network (e.g., Internet) from the perspective of the search engine.

Figure 21:
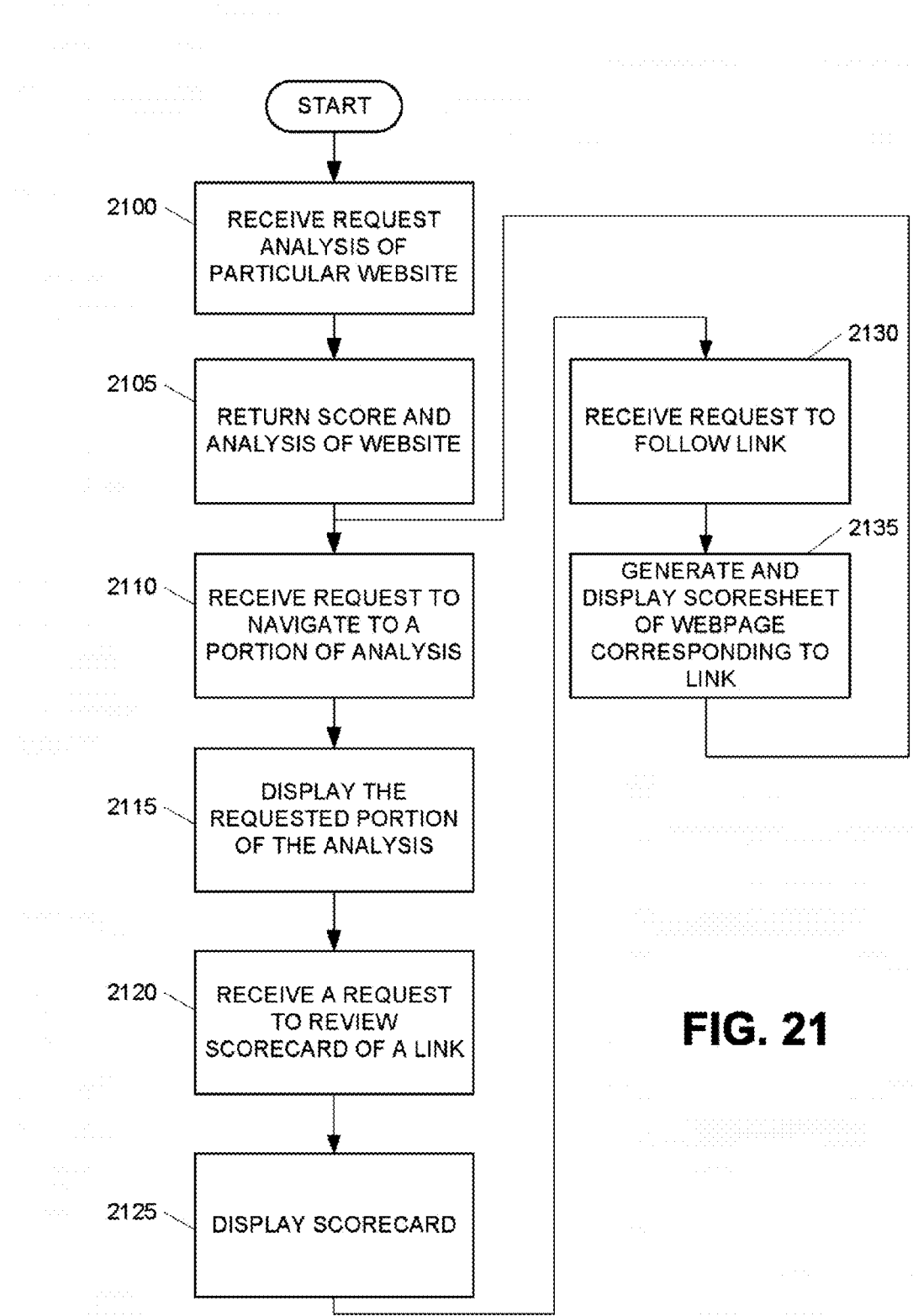
FIG. 21 illustrates a method for navigating an optimization engine according to aspects described herein.

FIG. 21 illustrates an example method of navigating through a series of websites, webpages, and links using an optimization engine. In step 2100, a user may request an analysis of a particular website. In step 2105, the optimization engine may return a score and an analysis of the website. The analysis may include scoring data generated and algorithms used by the search engine. In step 2110, the optimization engine may receive a request to navigate to a portion of the analysis that includes an analysis of at least one link. For example, a user may request to see the scoresheet (e.g., scoresheet 603 of FIG. 6) of a particular webpage in the website. The scoresheet may include an analysis of one or more links. In step 2115, the optimization engine may display the requested portion of the analysis (e.g., the scoresheet of a webpage) to the user. In step 2120, the user may subsequently request to view a scorecard (e.g., link scorecard 619 of FIG. 6) of a link contributing to the score of the webpage and website. In step 2125, the link scorecard may be displayed to the user. In step 2130, the user may request to follow the link. In response to the request, the optimization engine may generate and display a webpage scoresheet of the page to which the link is directed in step 2135. Accordingly, a user may continue to navigate the network in this fashion, viewing the path taken by the search engine and the analysis performed along the way. This provides the user with an in-depth view of how a search engine operates and ranks various webpages and network documents and how the user may affect his or her website's ranking from the perspective of the search engine.

Figure 22A:
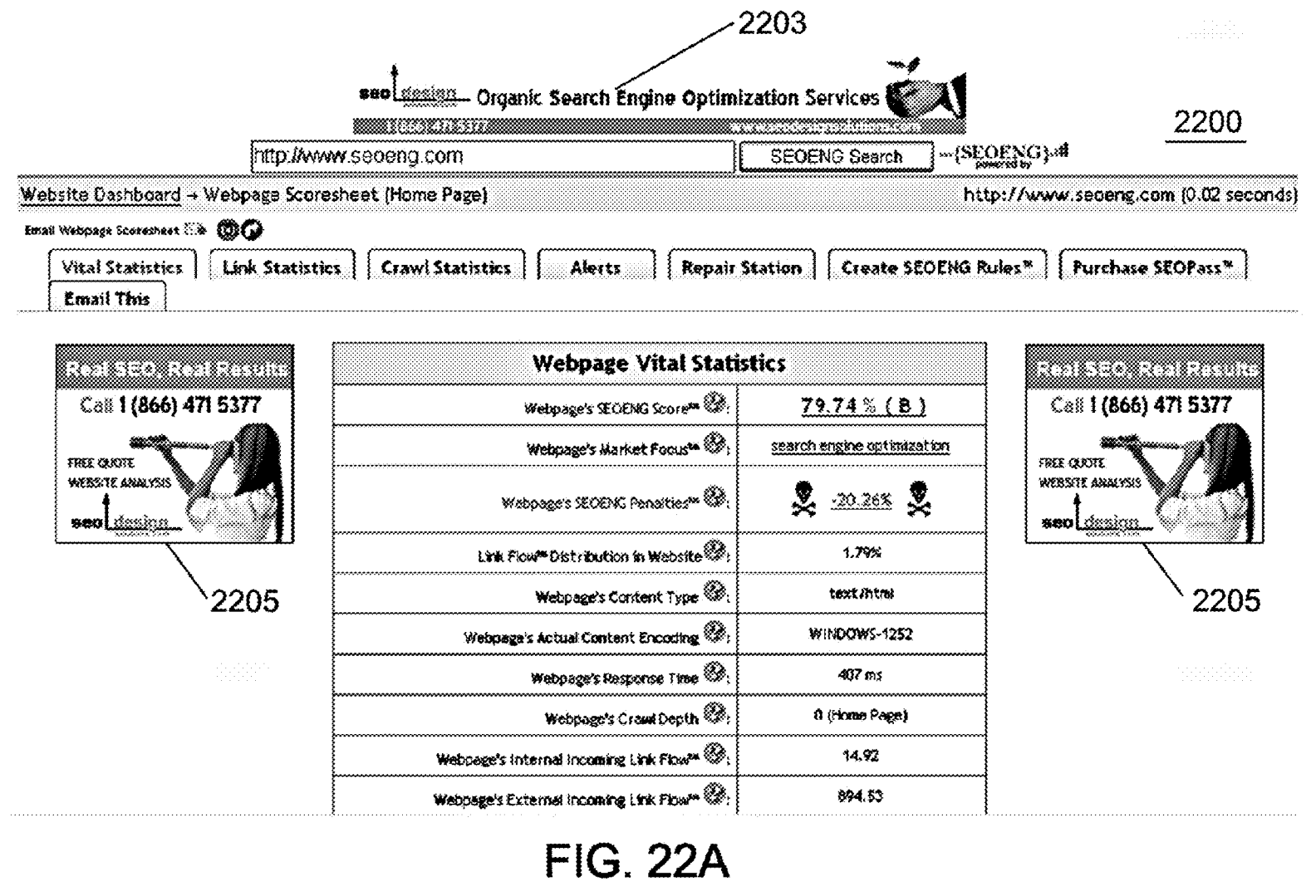
Figure 22B:
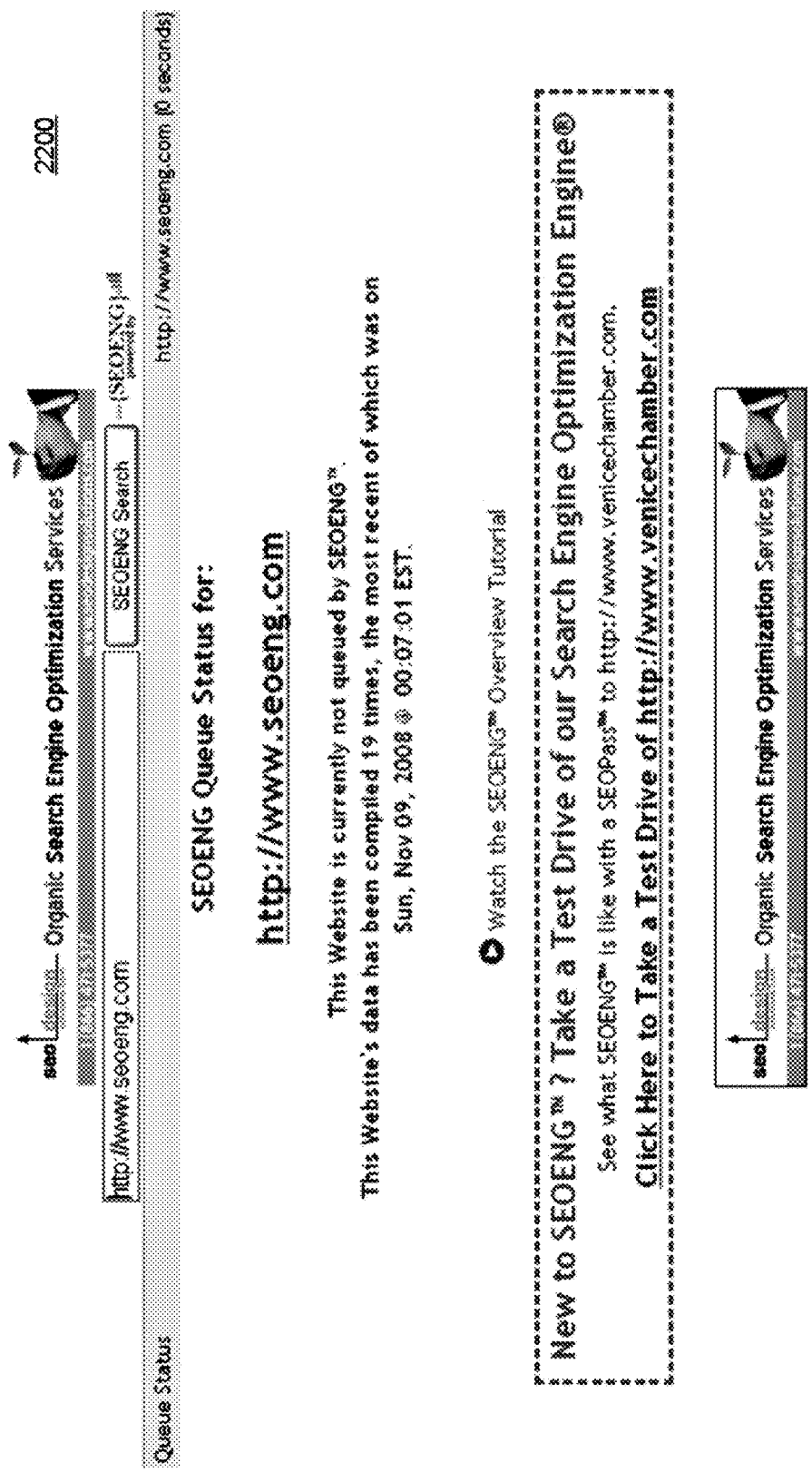

FIGS. 22A and 22B illustrate a private label interface for accessing and using an optimization engine. A private label interface 2200 allows a customer or client to have their logos, brands, images, banners, audio, video, text and the like placed in the optimization engine interface. Thus, instead of a generic or optimization engine specific interface, the interface may include logos 2203 and images 2205 that create the appearance and feel of the customer or client's website. FIG. 22B shows that the customer or client's branding persists through each portion of the optimization engine.

Figure 23:
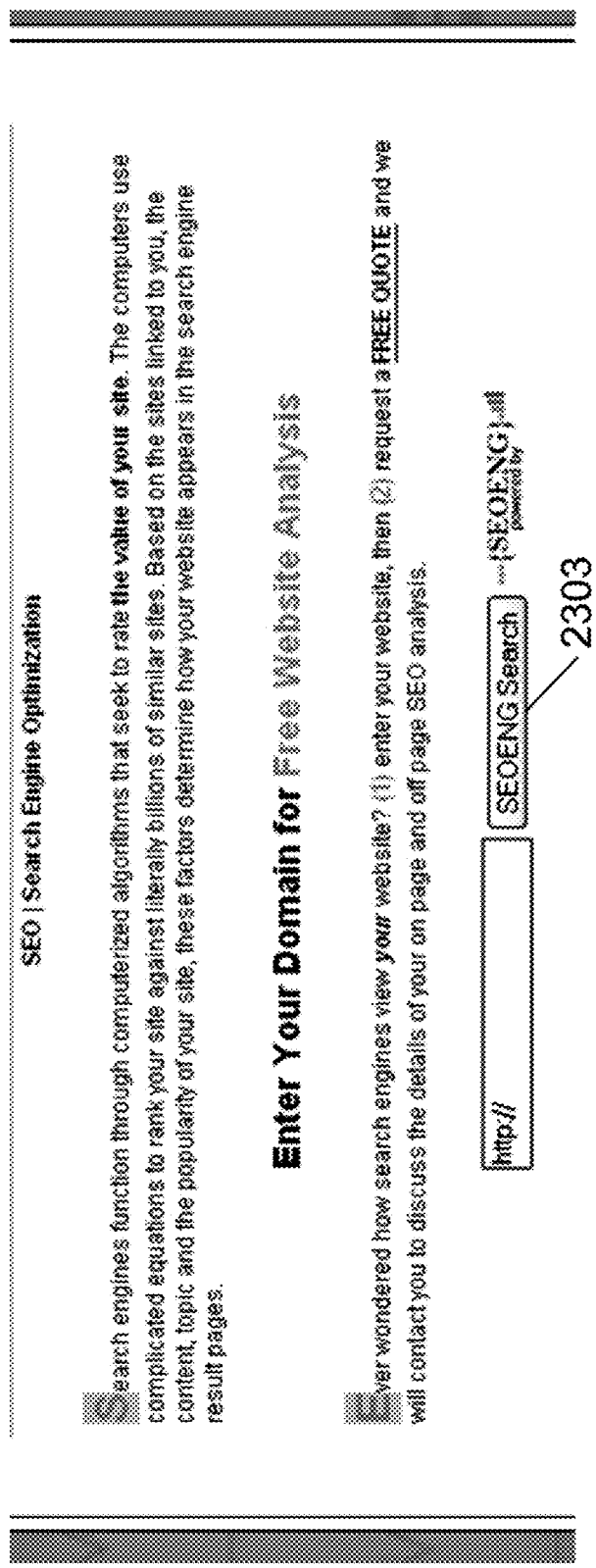
FIG. 23 illustrates an example website including a search bar for accessing a privately branded optimization engine interface according to one or more aspects described herein.

To provide access to a private label interface such as interface 2200 of FIGS. 22A & B, a customer or client may place a search bar on their website as illustrated in FIG. 23. The search bar 2303 of FIG. 23 may include code which allows the optimization engine to remember from where the user originated and will display the appropriate branding even when the user returns at a later date. In particular, the optimization engine may associate a user with a particular customer or client's website if they originated from the customer or client's optimization engine search bar even when the user enters via the generic optimization engine's website.

Figure 24A:
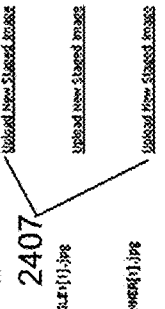
Figure 24C:
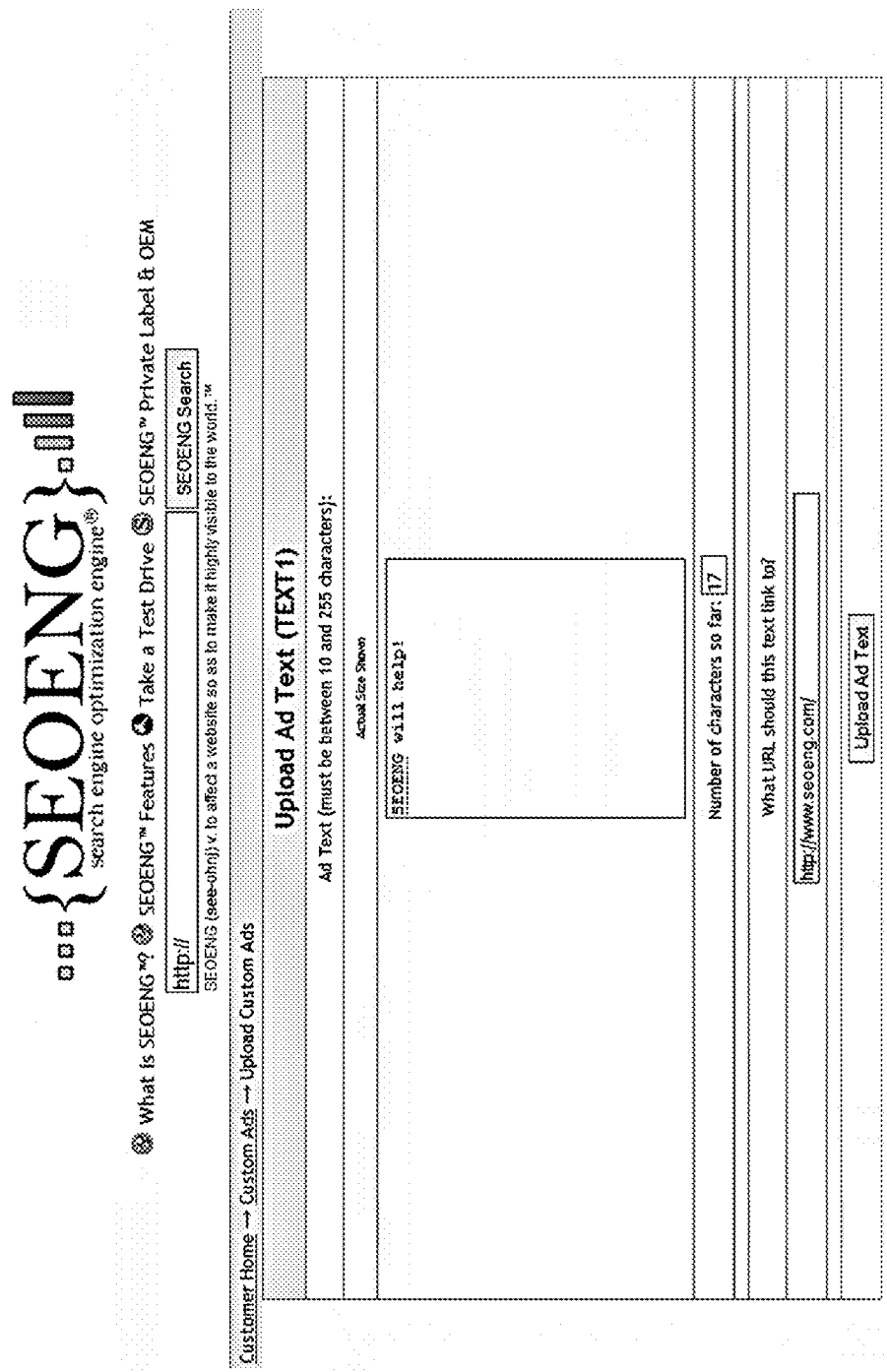

FIGS. 24A-C illustrate interfaces through which an optimization engine may be customized. FIG. 24A, for example, illustrates a customization overview where each of the images, banners, symbols, text chunks are listed to identify what will be shown in a live version. Customization overview 2400 may further provide an option 2403 to preview the optimization engine prior to publishing the branded engine to a live environment. Each listing 2401 may further specify a date that the advertisement piece was pushed live. Additionally, each listing 2401 may include a location 2405 of the advertisement piece (e.g., where an image is pulled or uploaded from) and an option 2407 to upload or change the listing. Once a user has finalized the engine, the user may choose the go live option 2409 to publish all of the advertisement pieces to their live customized engine.

FIG. 24B illustrates an interface from which a code segment may be copied or downloaded onto a customer's website for integration of a search bar that links to the customized optimization engine.

Figure 24D:
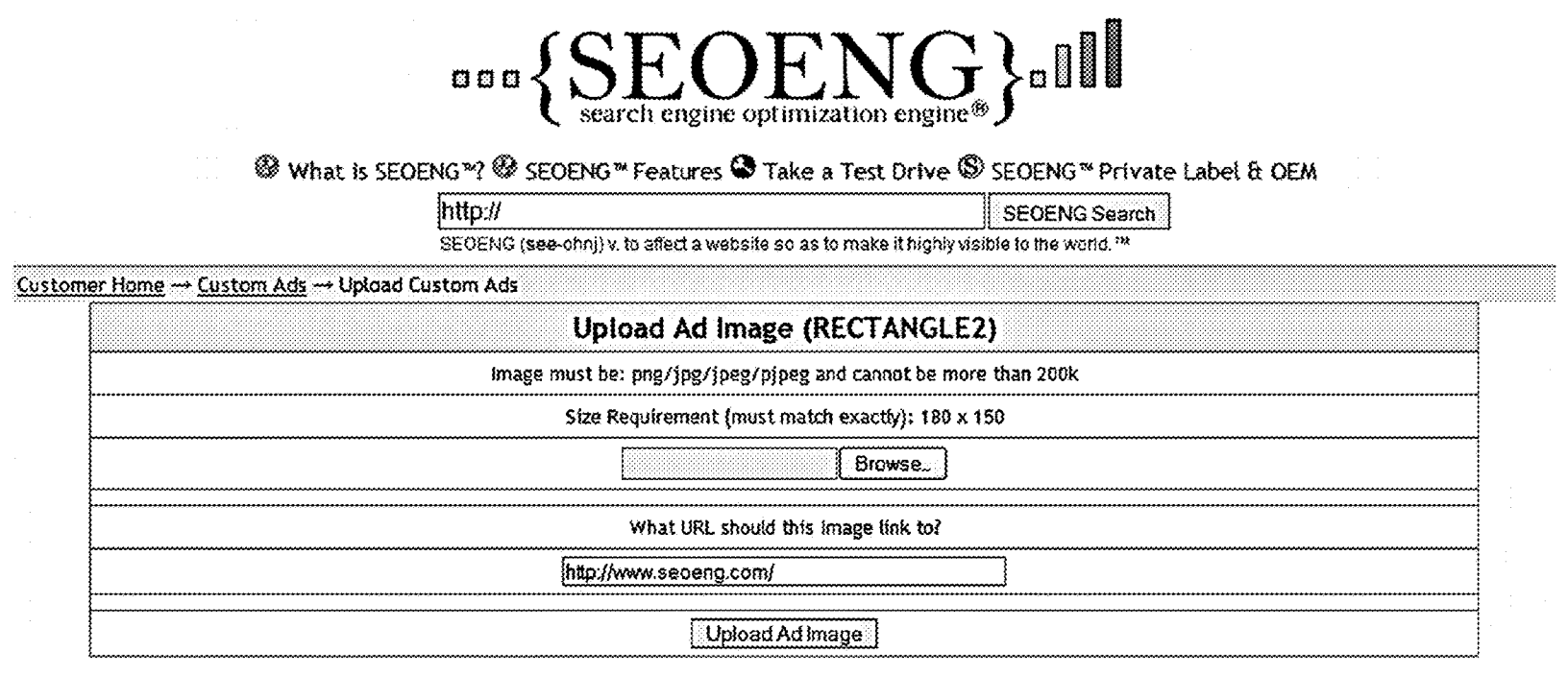

FIG. 24C illustrates a text upload interface for inserting text into the customized optimization engine and FIG. 24D illustrates an advertisement or image upload interface for inserting images into the customized engine.

Figure 25A:
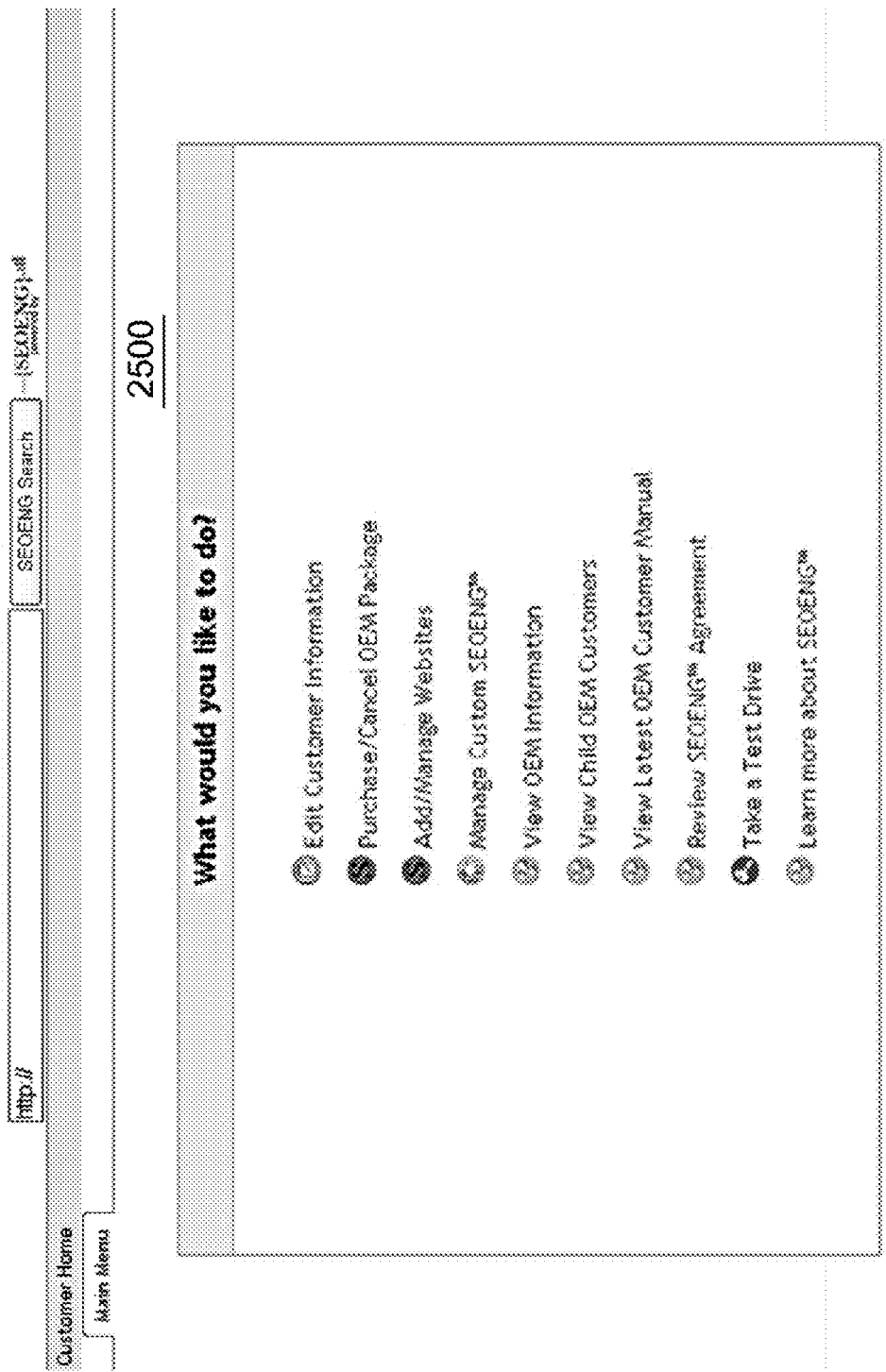
FIGS. 25A-B illustrate example customer home and account management interfaces according to one or more aspects described herein.

FIG. 25A illustrates a customer home interface where an optimization engine customer may manage one or more aspects of his or her account. For example, in interface 2500, a user may choose from a variety of options including editing customer information, purchasing or canceling an OEM package, adding or managing websites, managing a custom optimization engine (e.g., interface 2200 of FIGS. 22A & B), viewing OEM information, viewing child OEM customers, viewing the latest OEM customer manual, reviewing an agreement with the optimization engine company, taking a test drive and learning more about the optimization engine.

Figure 25B:
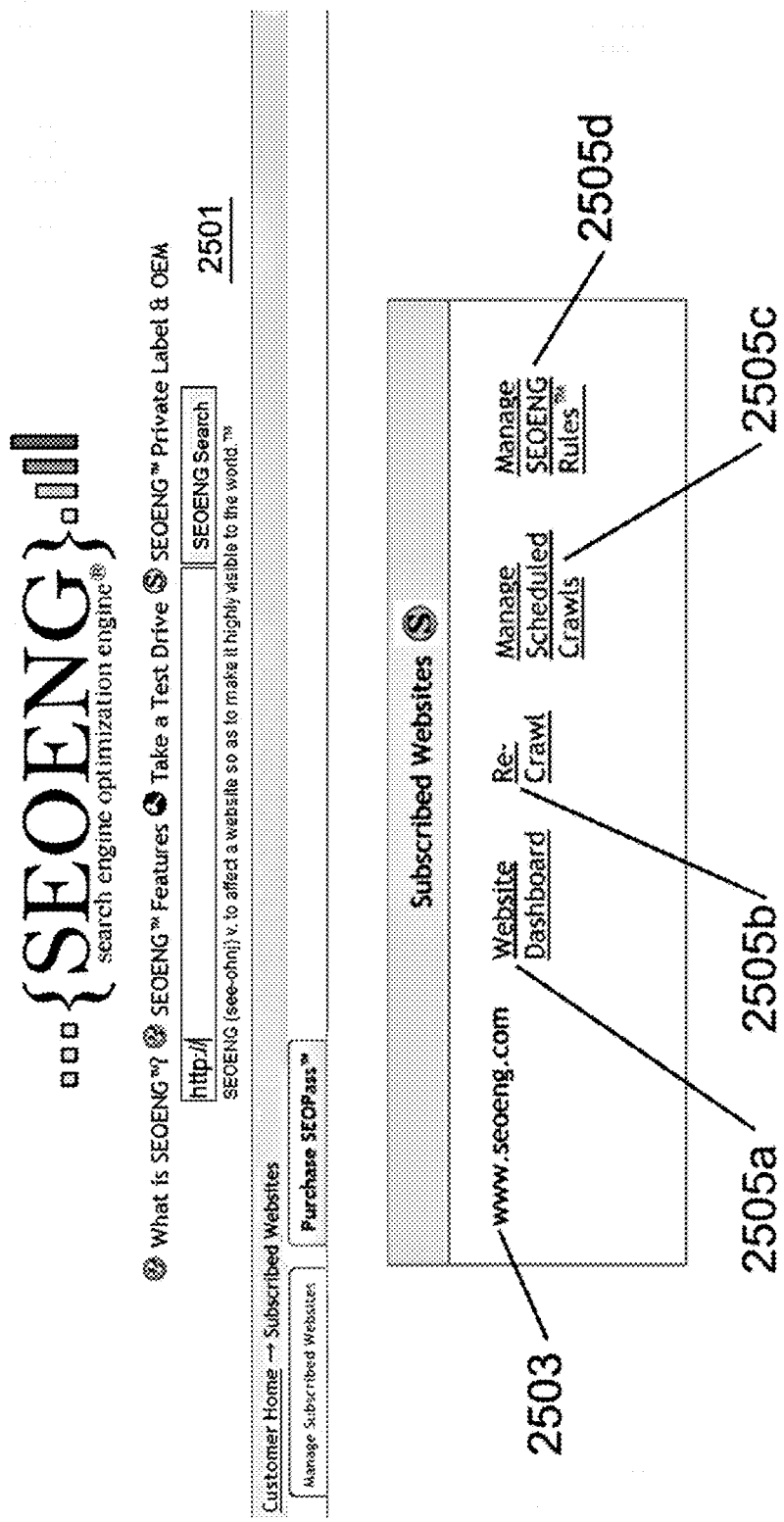

FIG. 25B illustrates an interface through which a user may view the websites to which he or she has subscribed or for which the user has purchased an analysis. In interface 2501, for example, the customer has one subscription 2503 to www.seoeng.com. Options 2505 may be provided for viewing the website dashboard 2505a, re-crawling the website 2505b, managing scheduled crawls (e.g., deleting, adding, changing schedule) 2505c and managing rules 2505d.

Figure 26:
FIG. 26 illustrates a page listing filter interface according to one or more aspects described herein.

FIG. 26 illustrates an interface through which an optimization engine customer may filter a page listing based on a specified criterion. Filtering criteria may include URL, MARKET FOCUS, META Titles, META Descriptions and/or META Keywords. A user may enter the wildcard phrase or keyword to filter in field 2601, select the criteria to be filtered through drop down menu 2603 and filter option 2605. The pages listed may then be filtered and a new page list may be displayed that match the specified parameters.

Figure 27:
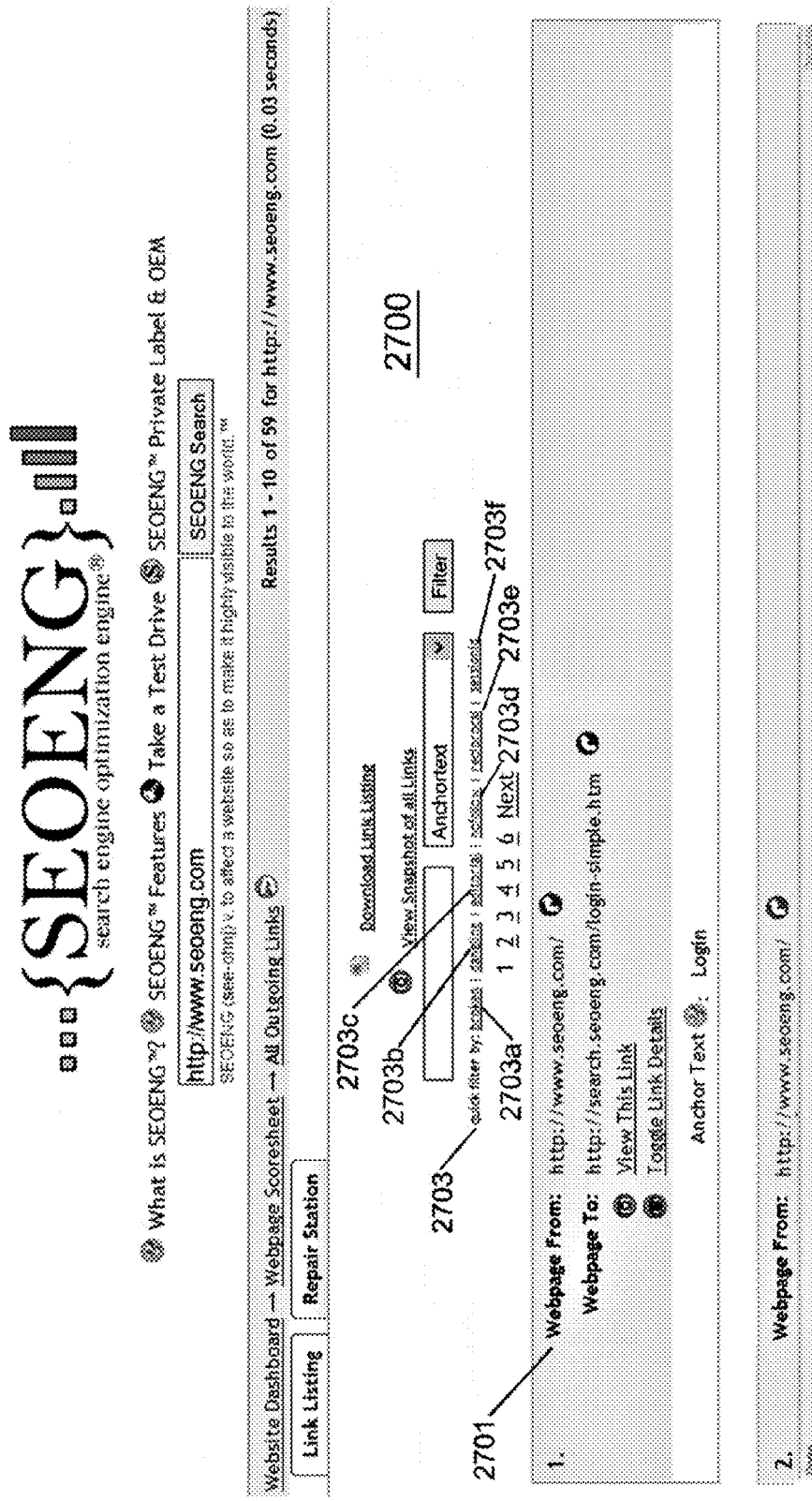
FIG. 27 illustrates a link listing filter interface according to one or more aspects described herein.

FIG. 27, on the other hand, illustrates an interface 2700 through which an optimization engine customer or user may filter a link listing based on various criteria. For example, link in listing 2701 may be filtered based on a keyword in the anchortext. Alternatively, a user may choose quick filtering options 2703. Options 2703 are predefined filters that may be used to identify broken links 2703a, dangling links 2703b, editorial links 2703c, nofollow links 2703d, reciprocal links 2703e and sessionid links 2703f.

As described in detail above, a navigable, transparent search engine which can be utilized to inspect how a search engine works may be used to optimize websites and other network documents. Such an optimization engine or tool may reside alongside a traditional search engine, and represent the navigation and transparency of that search engine.

It should be understood that any of the method steps, procedures or functions described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any type of now known or later developed computing devices and/or structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

What is claimed is:

1. A method comprising:
   receiving, by a computing system having at least one processor, a first request to analyze a first network document, the first request including an identifier of the first network document;
   in response to the first request:
   analyzing, by the computing system, the first network document according to one or more search engine algorithms;
   generating a display of a first scoring analysis including a first score of the first network document; and
   generating a display of an option to view a second scoring analysis of a second network document within the first network document, wherein the second network document includes at least one link contributing to the first scoring analysis;
   in response to receiving a selection of the option to view the second scoring analysis, generating a display of results of the second scoring analysis including a second score of the second network document, wherein the display of the results of the second scoring analysis includes a link flow distribution that indicates a likelihood that a user will access the second network document relative to a third network document within the first network document, and wherein the display of the results of the first scoring analysis includes at least one factor contributing to the first score and wherein the display of the results of the second scoring analysis does not include the at least one factor contributing to the first score;

receiving a second request to view a third scoring analysis of the at least one link, wherein the third scoring analysis includes an evaluation of one or more traffic-independent attributes of the at least one link, wherein the one or more traffic-independent attributes of the at least one link is different from attributes of a network destination specified by the at least one link; and in response to receiving the second request, generating a display of results of the third scoring analysis of the at least one link including the one or more traffic-independent attributes.

2. The method of claim 1, wherein the results of the second scoring analysis includes a listing of links evaluated in the second scoring analysis and wherein the method further comprises:

receiving a request to filter the listing of links based on a specified criteria; and in response to the request, generating a display of a second listing of links matching the specified criteria.

3. The method of claim 1, further comprising:

receiving a third request to access the network destination specified by the at least one link; and in response to the third request, performing a fourth scoring analysis on at least one non-traffic attribute of the network destination and generating a display of results of the fourth scoring analysis.

4. The method of claim 1, wherein the first scoring analysis includes analyzing link statistics.

5. The method of claim 1, wherein the second scoring analysis includes determining a category of content included in the second network document.

6. The method of claim 1, further comprising receiving a third request to create an alert for at least one scoring factor used in at least one of: the first scoring analysis, the second scoring analysis and the third scoring analysis.

7. The method of claim 1, further comprising:

monitoring for a specified condition associated with the first network document;

determining whether the specified condition has occurred; and in response to determining that the specified condition has occurred, performing a predefined action.

8. The method of claim 1, further comprising receiving a third request to generate a report including scoring analyses for a plurality of network documents within the first network document.

9. The method of claim 1, wherein at least one of the first, second and third scoring analyses includes a listing of links and wherein the method further comprises:

filtering the listing of links based on a user specified parameter.

10. The method of claim 1, wherein at least one of the first, second and third scoring analyses includes a listing of network documents and wherein the method further comprises:

filtering the listing of network documents based on a user specified parameter.

11. The method of claim 1, further comprising generating a displayable interface including one or more search results, the one or more search results including the first network document, and wherein the interface further includes an attribute evaluated in the first scoring analysis and a value of the attribute determined in the first scoring analysis.

12. A non-transitory computer-readable medium storing computer-readable instructions that, when executed by a computing device, cause the computing device to:

receive a first request to analyze a first network document, the first request including an identifier of the first network document;

in response to the first request:

analyze the first network document according to one or more search engine algorithms;

generate a display of a first scoring analysis including a first score of the first network document; and generate a display of an option to view a second scoring analysis of a second network document within the first network document, wherein the second network document includes at least one link contributing to the first scoring analysis;

in response to receiving a selection of the option to view the second scoring analysis, generate a display of results of the second scoring analysis including a second score of the second network document, wherein the display of the results of the second scoring analysis includes a link flow distribution that indicates a likelihood that a user will access the second network document relative to a third network document within the first network document, and wherein the display of the results of the first scoring analysis includes at least one factor contributing to the first score and wherein the display of the results of the second scoring analysis does not include the at least one factor contributing to the first score;

receive a second request to view a third scoring analysis of the at least one link, wherein the third scoring analysis includes an evaluation of one or more traffic-independent attributes of the at least one link, wherein the one or more traffic-independent attributes of the at least one link is different from attributes of a network destination specified by the at least one link; and in response to receiving the second request, generate a display of results of the third scoring analysis of the at least one link including the one or more traffic-independent attributes.

13. The non-transitory computer-readable medium of claim 12, wherein the results of the second scoring analysis includes a listing of links evaluated in the second scoring analysis, the non-transitory computer-readable medium storing computer-readable instructions that, when executed by the computing device, cause the computing device to:

receive a request to filter the listing of links based on a specified criteria; and in response to the request, generate a display of a second listing of links matching the specified criteria.

14. The non-transitory computer-readable medium of claim 12, storing computer-readable instructions that, when executed by the computing device, cause the computing device to:

receive a third request to access the network destination specified by the at least one link; and in response to the third request, perform a fourth scoring analysis on at least one non-traffic attribute of the network destination and generating a display of results of the fourth scoring analysis.

15. The non-transitory computer-readable medium of claim 12, wherein the first scoring analysis includes analyzing link statistics.

16. The non-transitory computer-readable medium of claim 12, wherein the second scoring analysis includes determining a category of content included in the second network document.

17. The non-transitory computer-readable medium of claim 12, storing computer-readable instructions that, when executed by the computing device, cause the computing device to:
 receive a third request to create an alert for at least one scoring factor used in at least one of: the first scoring analysis, the second scoring analysis and the third scoring analysis.

18. The non-transitory computer-readable medium of claim 12, storing computer-readable instructions that, when executed by the computing device, cause the computing device to:
 monitor for a specified condition associated with the first network document;
 determine whether the specified condition has occurred; and
 in response to determining that the specified condition has occurred, perform a predefined action.

19. The non-transitory computer-readable medium of claim 12, storing computer-readable instructions that, when executed by the computing device, cause the computing device to:
 receive a third request to generate a report including scoring analyses for a plurality of network documents within the first network document.

20. The non-transitory computer-readable medium of claim 12, wherein at least one of the first, second and third scoring analyses includes a listing of links, the non-transitory computer-readable medium storing computer-readable instructions that, when executed by the computing device, cause the computing device to:
 filter the listing of links based on a user specified parameter.

21. The non-transitory computer-readable medium of claim 12, wherein at least one of the first, second and third scoring analyses includes a listing of network documents, the non-transitory computer-readable medium storing computer-readable instructions that, when executed by the computing device, cause the computing device to:
 filter the listing of network documents based on a user specified parameter.

22. The non-transitory computer-readable medium of claim 12, storing computer-readable instructions that, when executed by the computing device, cause the computing device to:
 generate a displayable interface including one or more search results, the one or more search results including the first network document, and wherein the interface further includes an attribute evaluated in the first scoring analysis and a value of the attribute determined in the first scoring analysis.

23. An apparatus comprising:
 a processor; and
 memory storing computer-executable instructions that, when executed by the processor, cause the apparatus to:
  receive a first request to analyze a first network document, the first request including an identifier of the first network document;
  in response to the first request:
   analyze the first network document according to one or more search engine algorithms;
   generate a display of a first scoring analysis including a first score of the first network document; and
   generate a display of an option to view a second scoring analysis of a second network document within the first network document, wherein the second network document includes at least one link contributing to the first scoring analysis;
  in response to receiving a selection of the option to view the second scoring analysis, generate a display of results of the second scoring analysis including a second score of the second network document, wherein the display of the results of the second scoring analysis includes a link flow distribution that indicates a likelihood that a user will access the second network document relative to a third network document within the first network document, and wherein the display of the results of the first scoring analysis includes at least one factor contributing to the first score and wherein the display of the results of the second scoring analysis does not include the at least one factor contributing to the first score;
  receive a second request to view a third scoring analysis of the at least one link, wherein the third scoring analysis includes an evaluation of one or more traffic-independent attributes of the at least one link, wherein the one or more traffic-independent attributes of the at least one link is different from attributes of a network destination specified by the at least one link; and
  in response to receiving the second request, generate a display of results of the third scoring analysis of the at least one link including the one or more traffic-independent attributes.

24. The apparatus of claim 23, wherein the results of the second scoring analysis includes a listing of links evaluated in the second scoring analysis, and wherein the memory stores computer-executable instructions that, when executed by the processor, cause the apparatus to:
 receive a request to filter the listing of links based on a specified criteria; and
 in response to the request, generate a display of a second listing of links matching the specified criteria.

25. The apparatus of claim 23, wherein the memory stores computer-executable instructions that, when executed by the processor, cause the apparatus to:
 receive a third request to access the network destination specified by the at least one link; and
 in response to the third request, perform a fourth scoring analysis on at least one non-traffic attribute of the network destination and generating a display of results of the fourth scoring analysis.

26. The apparatus of claim 23, wherein the first scoring analysis includes analyzing link statistics.

27. The apparatus of claim 23, wherein the second scoring analysis includes determining a category of content included in the second network document.

28. The apparatus of claim 23, wherein the memory stores computer-executable instructions that, when executed by the processor, cause the apparatus to:
 receive a third request to create an alert for at least one scoring factor used in at least one of: the first scoring analysis, the second scoring analysis and the third scoring analysis.

29. The apparatus of claim 23, wherein the memory stores computer-executable instructions that, when executed by the processor, cause the apparatus to:

monitor for a specified condition associated with the first network document;
determine whether the specified condition has occurred; and
in response to determining that the specified condition has occurred, perform a predefined action.

30. The apparatus of claim 23, wherein the memory stores computer-executable instructions that, when executed by the processor, cause the apparatus to:
receive a third request to generate a report including scoring analyses for a plurality of network documents within the first network document.

31. The apparatus of claim 23, wherein at least one of the first, second and third scoring analyses includes a listing of links, and wherein the memory stores computer-executable instructions that, when executed by the processor, cause the apparatus to:
filter the listing of links based on a user specified parameter.

32. The apparatus of claim 23, wherein at least one of the first, second and third scoring analyses includes a listing of network documents, and wherein the memory stores computer-executable instructions that, when executed by the processor, cause the apparatus to:
filter the listing of network documents based on a user specified parameter.

33. The apparatus of claim 23, wherein the memory stores computer-executable instructions that, when executed by the processor, cause the apparatus to:
generate a displayable interface including one or more search results, the one or more search results including the first network document, and wherein the interface further includes an attribute evaluated in the first scoring analysis and a value of the attribute determined in the first scoring analysis.

* * * * *